United States Patent
Onodera et al.

(10) Patent No.: US 11,640,088 B2
(45) Date of Patent: May 2, 2023

(54) DISPLAY DEVICE AND METHOD OF MANUFACTURING SEMICONDUCTOR DEVICE

(71) Applicant: Japan Display Inc., Tokyo (JP)

(72) Inventors: Ryo Onodera, Tokyo (JP); Hajime Watakabe, Tokyo (JP); Akihiro Hanada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 232 days.

(21) Appl. No.: 17/159,154

(22) Filed: Jan. 27, 2021

(65) Prior Publication Data

US 2021/0240042 A1    Aug. 5, 2021

(30) Foreign Application Priority Data

Jan. 30, 2020    (JP) .............................. JP2020-013402

(51) Int. Cl.
  *G02F 1/1362*    (2006.01)
  *G02F 1/1335*    (2006.01)
  *G02F 1/1368*    (2006.01)

(52) U.S. Cl.
  CPC .... *G02F 1/136222* (2021.01); *G02F 1/13685* (2021.01); *G02F 1/133512* (2013.01); *G02F 1/133514* (2013.01)

(58) Field of Classification Search
  CPC ......... G02F 1/136222; G02F 1/133514; G02F 1/133519; G02F 1/136286
  See application file for complete search history.

(56) References Cited

U.S. PATENT DOCUMENTS

| | | | |
|---|---|---|---|
| 2012/0199893 A1* | 8/2012 | Okabe | H01L 27/14689 257/E31.083 |
| 2013/0021550 A1* | 1/2013 | Watakabe | G09G 3/3607 349/61 |
| 2013/0154041 A1 | 6/2013 | Kokubun et al. | |
| 2016/0225912 A1* | 8/2016 | Cao | H01L 29/45 |
| 2017/0090206 A1* | 3/2017 | Kim | H01L 27/14627 |
| 2018/0111291 A1* | 4/2018 | Choi | B29C 33/3842 |

FOREIGN PATENT DOCUMENTS

| | | |
|---|---|---|
| JP | 2013-24996 A | 2/2013 |
| JP | 2013-131553 A | 7/2013 |

* cited by examiner

*Primary Examiner* — Jonathan Y Jung
(74) *Attorney, Agent, or Firm* — Xsensus LLP

(57) ABSTRACT

A high definition display device is provided. The display device includes an array substrate, and an opposing substrate. The array substrate has a substrate, and on the substrate, a first pixel having a first color filter and a second pixel having a second color filter disposed adjacent to the first pixel. Each of the first color filter and the second color filter has a first dielectric layer, a transmissive layer disposed on the first dielectric layer, and a second dielectric layer disposed on the transmissive layer. The transmissive layer of the first color filter has a first film thickness, and the transmissive layer of the second color filter has a second film thickness larger than the first film thickness. On the transmissive layer of the second color filter, a first layer different from the transmissive layer is disposed on a side of the transmissive layer of the first color filter. A height of a bottom face of the first layer is equal to the first film thickness.

18 Claims, 18 Drawing Sheets

DISPLAY DEVICE AND METHOD OF MANUFACTURING SEMICONDUCTOR DEVICE

CROSS-REFERENCE TO RELATED APPLICATION

The present application claims priority from Japanese Patent Application JP 2020-013402 filed on Jan. 30, 2020, the content of which is hereby incorporated by reference into this application.

BACKGROUND OF THE INVENTION

This disclosure relates to a display device. More specifically, this disclosure is applicable to a display device including an array substrate provided with color filters and a method of manufacturing a semiconductor device configuring the display device.

A technique in which in a display device, color filters are provided on an array substrate is proposed (for example, Japanese Patent Application JP 2013-24996). Also, proposed is a technique in which in making a multilayer interference filter provided in a solid state imaging device, "a portion 23ia1 is etched (half etched) to the film thickness corresponding to the wavelength band of the green color (for example, 35 nm) for film thinning" (see paragraph 0065 and FIG. 4(a) in Japanese Patent Application JP 2013-131553).

The color filters made of inorganic films each have the configuration of an interference color filter in which dielectrics having different refractive indexes are stacked. The color filters can transmit only the particular wavelengths of the red color, the green color, the blue color, and the like by optionally changing the film thicknesses of the interference layers in the stack structure.

SUMMARY OF THE INVENTION

When the control of the film thicknesses of the interference layers in the stack structure is performed by the half etching of a dry etching process, variation can be caused between the film thicknesses of the interference layers in the plane of the array substrate due to etching amount variation. Consequently, it is difficult to make uniform, in the plane of the array substrate, the film thicknesses of the interference layers configuring the respective color filters corresponding to the red color, the green color, and the blue color.

In this disclosure, in the film forming of the interference layers, etch stopper layers are selectively formed in the regions to have the desired film thicknesses, thereby preventing the interference layers from being shaved in the dry etching. This makes it possible to precisely control, in the plane of the array substrate, the film thicknesses of the interference layers configuring the respective color filters corresponding to the red color, the green color, and the blue color.

An object of this disclosure is to provide a high definition display device.

Other objects and novel features will be apparent from the description of this specification and the accompanying drawings.

The overview of the representative inventions of the present invention will be briefly described as follows.

That is, according to an embodiment, a display device includes an array substrate, and an opposing substrate. The array substrate has a substrate, and on the substrate, a first pixel having a first color filter and a second pixel having a second color filter disposed adjacent to the first pixel. Each of the first color filter and the second color filter has a first dielectric layer, a transmissive layer disposed on the first dielectric layer, and a second dielectric layer disposed on the transmissive layer. The transmissive layer of the first color filter has a first film thickness. The transmissive layer of the second color filter has a second film thickness larger than the first film thickness. On the transmissive layer of the second color filter, a first layer different from the transmissive layer is disposed on a side of the transmissive layer of the first color filter. A height of a bottom face of the first layer is equal to the first film thickness.

Also, according to another embodiment, a method of manufacturing a semiconductor device includes a step of forming a first dielectric layer on a substrate, a step of forming a transmissive layer on the first dielectric layer, and a step of forming a second dielectric layer on the transmissive layer. The step of forming the transmissive layer includes a step of forming, on the first dielectric layer, a first film configuring part of the transmissive layer by a third film thickness, a step of selectively forming a first etching stopper layer on the first film, a step of forming a second film configuring part of the transmissive layer so as to cover the first film and the first etching stopper layer, a step of selectively forming, on the second film, a second etching stopper layer partially overlapped with the first etching stopper layer in cross-sectional view, a step of forming a third film configuring part of the transmissive layer so as to cover the second film and the second etching stopper layer, a step of selectively forming, on the third film, a third etching stopper layer partially overlapped with the second etching stopper layer in cross-sectional view, a first removing step of removing, with the third etching stopper layer as an etching mask of dry etching, the second film and the third film on the first etching stopper layer except for a portion overlapped with the second etching stopper layer, and the third film on the second etching stopper layer except for a portion overlapped with the third etching stopper layer, and a second removing step of removing the first etching stopper layer except for the portion overlapped with the second etching stopper layer, the second etching stopper layer except for the portion overlapped with the third etching stopper layer, and the third etching stopper layer.

DETAILED DESCRIPTION OF THE PREFERRED EMBODIMENTS

Figure 1:
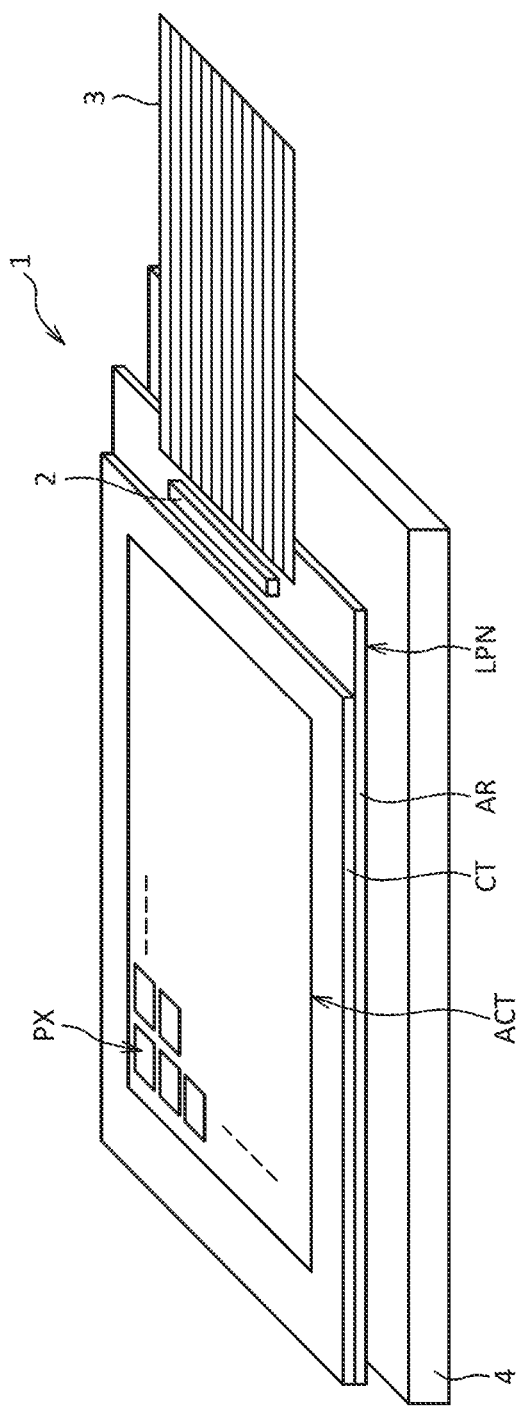
FIG. 1 is a diagram schematically illustrating the configuration of a display device according to an embodiment.

Respective embodiments of the present invention will be described below with reference to the drawings.

It should be noted that this disclosure is merely an example, and any appropriate change by holding the purport of the invention that can be readily conceived by those skilled in the art is, of course, encompassed in the scope of the present invention. Also, the width, thickness, shape, and the like of each portion are sometimes schematically illustrated in the drawings, as compared with the actual form, in order to make the description more clearly, but are merely an example, and do not limit the understanding of the present invention.

Also, in this specification and the respective drawings, the same elements as those described previously with regard to the already described drawings are indicated by the same reference numerals, and the detailed description thereof is sometimes omitted, as appropriate.

In these embodiments, as an example of a display device, a liquid crystal display device is disclosed. The liquid crystal display device can be used for various devices such as an ultrahigh definition display device for VR (virtual reality), a smartphone, a tablet terminal, a mobile phone terminal, a personal computer, a television receiver, an in-vehicle device, and a game machine.

It should be noted that in this specification and the scope of claims, the expressions "up", "down", and the like in describing the drawings denote the relative position relationship between a structure body noted and another structure body. Specifically, when seen from the side, the direction from a first substrate (array substrate) toward a second substrate (opposing substrate) is defined as the "up", and the reverse direction is defined as the "down".

Also, the "inside" and the "outside" denote the relative position relationship between two portions based on a display region. That is, the "inside" refers to the side relatively closer to the display region with respect to one portion, and the "outside" refers to the side relatively farther from the display region with respect to the one portion. However, the "inside" and the "outside" referred to herein are defined in a state where the liquid crystal display device is not folded.

The "display device" refers to all display devices that display an image by using a display panel. The "display panel" refers to a structure body that displays the image by using an electric optical layer. For example, the term "display panel" sometimes refers to a display cell including the electric optical layer, and sometimes refers to a structure body in which other optical members (for example, a polarization member, a backlight, a touch panel, and the like) are mounted with respect to the display cell. Here, unless any technical inconsistency occurs, the "electric optical layer" can include a liquid crystal layer, an electrochromic (EC) layer, and the like. Therefore, the embodiments described later will be described by illustrating, as the display panel, a liquid crystal panel including the liquid crystal layer, but the application to other display panels including the electric optical layer described above is not excluded.

EMBODIMENTS

FIG. 1 is a diagram schematically illustrating the configuration of the display device according to the embodiment. A display device 1 is provided with an active matrix type transmissive liquid crystal display panel LPN, a driving IC chip 2 and a flexible wiring substrate 3 connected to the liquid crystal display panel LPN, a backlight 4 illuminating the liquid crystal display panel LPN, and the like.

The liquid crystal display panel LPN is provided with an array substrate AR, an opposing substrate CT disposed opposed to the array substrate AR, and the liquid crystal layer, not illustrated, held between the array substrate AR and the opposing substrate CT. The liquid crystal display panel LPN like this is provided with an active area ACT displaying an image. The active area ACT is configured of a plurality of pixels PX disposed in an m by n matrix shape (where m and n are positive integers).

The backlight 4 is disposed on the rear face side of the array substrate AR. The backlight 4 like this provided with a light emitting diode (LED) as a light source or a cold cathode fluorescent lamp (CCFL) is applied, but the description of the detailed configuration thereof is omitted.

Figure 2:
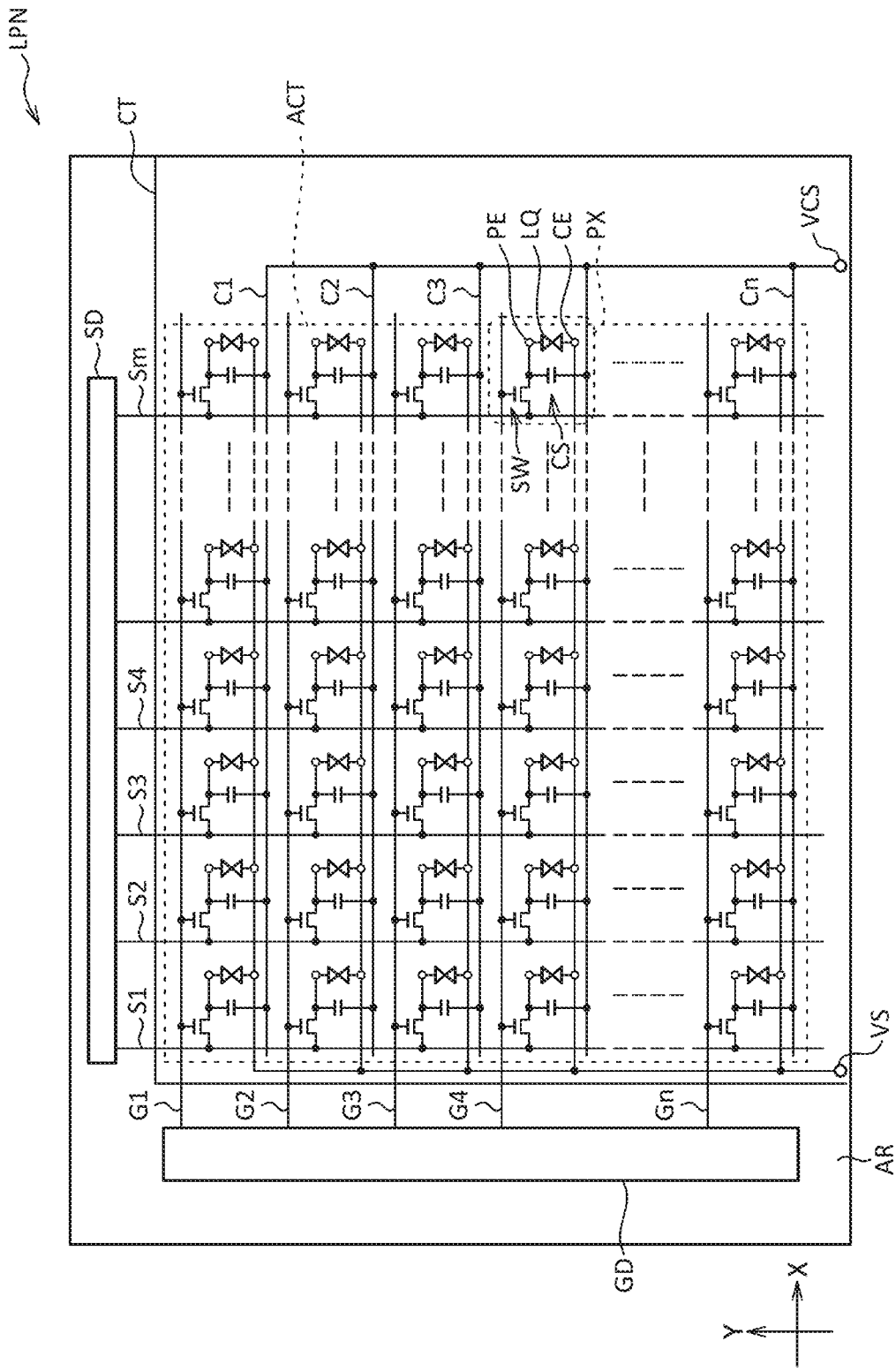
FIG. 2 is a diagram schematically illustrating the configuration of a liquid crystal display panel illustrated in FIG. 1 and an equivalent circuit.

FIG. 2 is a diagram schematically illustrating the configuration of the liquid crystal display panel LPN illustrated in FIG. 1 and an equivalent circuit. The array substrate AR is provided, in the active area ACT, with a plurality of gate wirings G (G1 to Gn), a plurality of shared wirings C (C1 to Cn), a plurality of source wirings S (S1 to Sm), and the like. Each of the gate wirings G is drawn outside of the active area ACT, and is connected to a gate driver GD. Each of the source wirings S is drawn outside of the active area ACT, and is connected to a source driver SD.

Each of the pixels PX is provided with a switching element SW, a pixel electrode PE, a common electrode CE, and the like disposed on the array substrate AR. The switching element SW is electrically connected to the gate wiring G and the source wiring S. The pixel electrode PE is electrically connected to the switching element SW. The common electrode CE is shareably formed with respect to a plurality of pixel electrodes PE via a liquid crystal layer LQ. The common electrode CE is electrically connected to a power supply VS via the shared wiring C.

In this embodiment, the common electrode CE may be disposed on the array substrate AR, or may be disposed on the opposing substrate CT. In the liquid crystal display panel LPN having the configuration in which the common electrode CE is disposed on the array substrate AR together with the pixel electrode PE, a liquid crystal molecule configuring the liquid crystal layer LQ is switched by mainly using a lateral electric field formed between the pixel electrode PE and the common electrode CE. Also, in the liquid crystal display panel LPN having the configuration in which the common electrode CE is disposed on the opposing substrate CT, the liquid crystal molecule configuring the liquid crystal layer LQ is switched by mainly using a vertical electric field or an oblique electric field formed between the pixel electrode PE and the common electrode CE.

Figure 3:
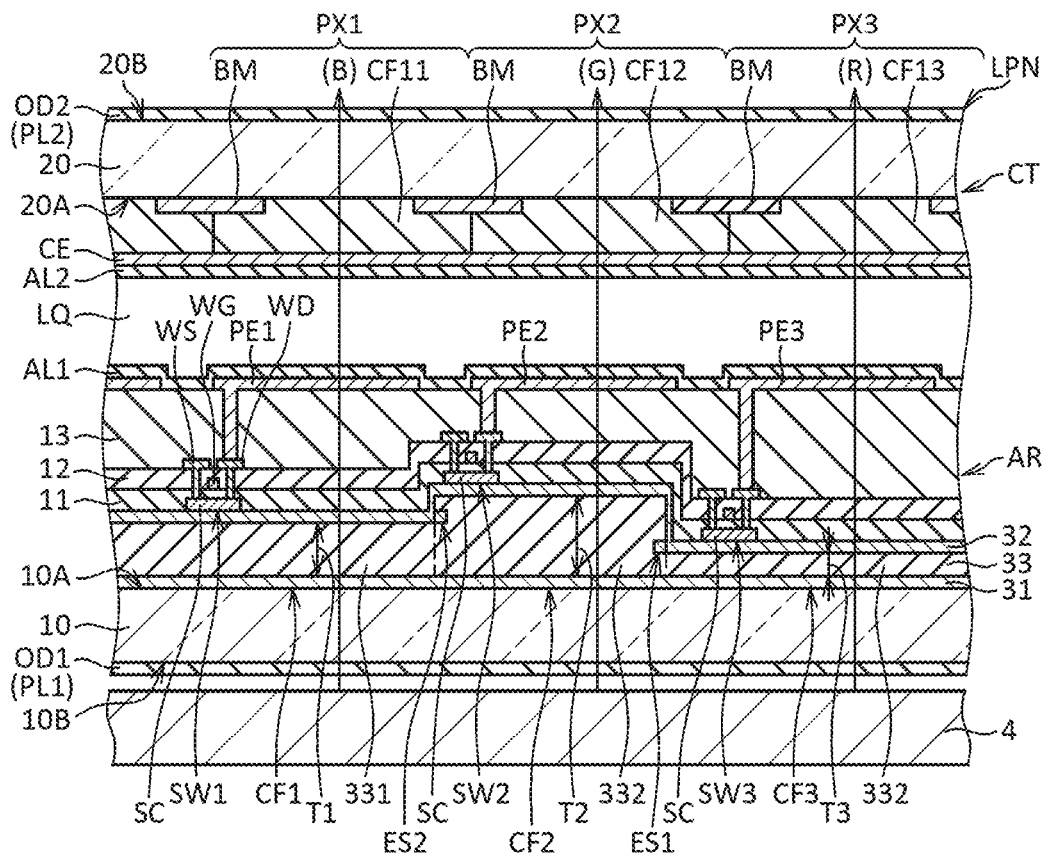
FIG. 3 is a diagram schematically illustrating the cross-sectional structure of a semiconductor device configuring the liquid crystal display panel illustrated in FIG. 2.

FIG. 3 is a diagram schematically illustrating the cross-sectional structure of a semiconductor device configuring the liquid crystal display panel LPN illustrated in FIG. 2. FIG. 3 illustrates, in the cross-sectional structure of the semiconductor device configuring the liquid crystal display panel LPN, the schematic cross-sectional structure of a first pixel PX1 displaying a blue color, a second pixel PX2 displaying a green color, and a third pixel PX3 displaying a red color.

That is, the first pixel PX1 is provided with a first color filter CF1, a first switching element SW1, a first pixel electrode PE1, and the like. The second pixel PX2 is provided with a second color filter CF2, a second switching element SW2, a second pixel electrode PE2, and the like. The third pixel PX3 is provided with a third color filter CF3, a third switching element SW3, a third pixel electrode PE3, and the like.

The array substrate AR is formed by using a first insulation substrate 10 having optical transmission properties, such as a glass substrate. The first color filter CF1, the second color filter CF2, and the third color filter CF3 are disposed on the first insulation substrate 10. The first color filter CF1 transmits light in a first wavelength range including a blue color wavelength (for example, the wavelength range of 400 nm to 500 nm). The second color filter CF2 transmits light in a second wavelength range including a green color wavelength having a longer wavelength than the first wavelength range (for example, the wavelength range of 500 nm to 580 nm). The third color filter CF3 transmits light in a third wavelength range including a red color wavelength having a longer wavelength than the second wavelength range (for example, the wavelength range of 580 nm to 700 nm).

Each of the first color filter CF1, the second color filter CF2, and the third color filter CF3 mainly reflects any wavelength other than the wavelength range transmitted. In the first color filter CF1, the reflectance in the second wavelength range and the third wavelength range is higher than the reflectance in the first wavelength range. In the second color filter CF2, the reflectance in the first wavelength range and the third wavelength range is higher than the reflectance in the second wavelength range. In the third color filter CF3, the reflectance in the first wavelength range and the second wavelength range is higher than the reflectance in the third wavelength range.

The light emission spectrum of the backlight 4 applied in this embodiment has a luminescence peak (approximately 450 nm) in the first wavelength range. The second color filter CF2 has a reflectance characteristic in which the reflectance near 450 nm that is the luminescence peak of the backlight 4 is higher than the reflectance in the second wavelength range, and the third color filter CF3 has a reflectance characteristic in which the reflectance near 450 nm that is the luminescence peak of the backlight 4 is higher than the reflectance in the third wavelength range.

In the illustrated example, the first color filter CF1 is disposed corresponding to the first pixel PX1. The second color filter CF2 is disposed corresponding to the second pixel PX2. The third color filter CF3 is disposed corresponding to the third pixel PX3.

The first color filter CF1, the second color filter CF2, and the third color filter CF3 like these may be of the optical absorptive type (made of, for example, a coloring resin), but in the illustrated example, a Fabry-Perot filter using the principle of optical interference is adopted. That is, each of the first color filter CF1, the second color filter CF2, and the third color filter CF3 is configured by stacking a plurality of thin films having different refraction indexes, and is provided with a first semi-transmissive layer 31 disposed on an inner face 10A of the first insulation substrate 10, a second semi-transmissive layer 32 opposed to the first semi-transmissive layer 31, and a transmissive layer (or referred to as a spacer layer or an interference layer) 33 disposed between the first semi-transmissive layer 31 and the second semi-transmissive layer 32.

More specifically, the first semi-transmissive layer 31 and the second semi-transmissive layer 32 are respectively shareably provided in the first color filter CF1, the second color filter CF2, and the third color filter CF3. The first semi-transmissive layer 31 and the second semi-transmissive layer 32 like these may be metal thin films formed of silver (Ag) and the like so as to have a film thickness on the order of several tens of nm, or may have a configuration in which a plurality of dielectric films having different refraction indexes are stacked. As an example, each of the first semi-transmissive layer 31 and the second semi-transmissive layer 32 can be formed of a stack body including a silicon nitride (SiN) layer and a silicon oxide (SiO$_2$) layer, and the silicon nitride (SiN) layers and the silicon oxide (SiO$_2$) layers of the first semi-transmissive layer 31 and the second semi-transmissive layer 32 are alternately stacked. The number of the dielectric films stacked in the stack body like this is two or more, but as the number of layers is increased, the number of manufacturing steps is increased, leading to increased manufacturing cost, so that the number of layers is desirably on the order of four or less. It should be noted that the semi-transmissive layer can also be referred to as a dielectric layer or a dielectric film stack body. That is, the first semi-transmissive layer 31 can also be referred to as a first dielectric layer, and the second semi-transmissive layer 32 can also be referred to as a second dielectric layer.

The transmissive layer 33 is a single dielectric film, and can be formed of the silicon nitride layer or the silicon oxide layer. The transmissive layer 33 includes a first transmissive layer 331, a second transmissive layer 332, and a third transmissive layer 333 having different film thicknesses.

The first color filter CF1 is provided with the first transmissive layer 331 having a first film thickness T1, as the transmissive layer 33 disposed between the first semi-transmissive layer 31 and the second semi-transmissive layer 32. The second color filter CF2 is provided with the second transmissive layer 332 having a second film thickness T2 different from the first film thickness T1, as the transmissive layer 33 disposed between the first semi-transmissive layer 31 and the second semi-transmissive layer 32. The third color filter CF3 is provided with the third transmissive layer 333 having a third film thickness T3 different from the first film thickness T1 and the second film thickness T2, as the transmissive layer 33 disposed between the first semi-transmissive layer 31 and the second semi-transmissive layer 32. The first transmissive layer 331, the second transmissive layer 332, and the third transmissive layer 333 respectively have different film thicknesses, but are connected to each other.

Part of a first etching stopper layer (first layer) ES1 for precisely controlling the film thickness T3 of the third transmissive layer 333 and part of a second etching stopper layer (second layer) ES2 for precisely controlling the film thickness T1 of the first transmissive layer 331 are present in the interior of the region of the second semi-transmissive layer 32. The first etching stopper layer ES1 is disposed in the region of the second transmissive layer 332 at the position where the height of the lower face (bottom face) of the first etching stopper layer ES1 is the same as the third film thickness T3 of the third semi-transmissive layer 333, on the side of the second transmissive layer 332 contacted with the third transmissive layer 333, seen from the upper face of the first semi-transmissive layer 31. Also, the second etching stopper layer ES2 is disposed in the region of the second transmissive layer 332 at the position where the height of the lower face (bottom face) of the second etching stopper layer ES2 is the same as the first film thickness T1 of the first semi-transmissive layer 331, on the side of the second transmissive layer 332 contacted with the first transmissive layer 331, seen from the upper face of the first semi-transmissive layer 31. The first etching stopper layer ES1 and the second etching stopper layer ES2 can be formed of aluminum oxide films (AIO films). It should be noted that although the control of the first film thickness T1, the second film thickness T2, and the third film thickness T3 by using the aluminum oxide films (AIO films) as the etching stopper layers will be described later, the etching stopper layers ES1 and ES2 are selectively formed in the regions to have the desired film thicknesses in the film forming of the transmissive layer (interference layer) 33, thereby preventing the transmissive layer (interference layer) 33 from being shaved in dry etching. This precisely controls the film thicknesses of the interference layers configuring the respective color filters corresponding to the red color, the green color, and the blue color in the plane of the array substrate. Thus, the high definition display device can be provided. It should be noted that as the etching stopper layer, it is possible to use, other than the aluminum oxide film, some material that does not melt the silicon nitride film and the silicon oxide film and enables the etching. For example, the aluminum oxide film can be replaced with a transparent oxide conductor, such as ITO, that enables the etching by a mixed acid based on an oxalic-acid, a metal, such as molybdenum, that enables the etching by a mixed solution containing a phosphoric acid, a nitric acid, and the like.

All of the first switching element SW1, the second switching element SW2, and the third switching element SW3 are configured of top gate thin film transistors (TFTs), and have substantially the same configuration. Here, the first switching element SW1 will be described more specifically, and the description of the configuration of the second switching element SW2 and the third switching element SW3 is omitted.

That is, the first switching element SW1 is provided with a silicon semiconductor layer SC disposed on the third color filter CF3 (strictly, on the semi-transmissive layer 32). It should be noted that the top of the second semi-transmissive layer 32 may be covered with an interlayer insulation film by the silicon oxide layer, thereby forming the silicon semiconductor layer SC on the interlayer insulation film. The silicon semiconductor layer is formed of polysilicon, but can also be formed of amorphous silicon. The silicon semiconductor layer SC is covered with a first insulation film 11 having the role as a gate oxide film. Also, the first insulation film 11 covers the first color filter CF1, the second color filter CF2, and the third color filter CF3.

A gate electrode WG of the first switching element SW1 is formed on the first insulation film 11, and is located immediately above the silicon semiconductor layer SC. The gate electrode WG is electrically connected to the gate wiring, not illustrated, and is covered by a second insulation film 12. Also, the second insulation film 12 is also disposed on the first insulation film 11.

A source electrode WS and a drain electrode WD of the first switching element SW1 are formed on the second insulation film 12. The source electrode WS is electrically connected to the source wiring, not illustrated. Each of the source electrode WS and the drain electrode WD is contacted with the silicon semiconductor layer SC through a contact hole penetrating through the first insulation film 11 and the second insulation film 12.

The first switching element SW1 having such the configuration is covered by a third insulation film 13. Likewise, the second switching element SW2 and the third switching element SW3 are also covered by the third insulation film 13. Also, the third insulation film 13 is also disposed on the second insulation film 12.

The first pixel electrode PE1 is formed on the third insulation film 13, and is located above the first color filter CF1. The first pixel electrode PE1 is electrically connected to the drain electrode WD of the first switching element SW1 through a contact hole penetrating through the third insulation film 13.

Likewise, the second pixel electrode PE2 is formed on the third insulation film 13, and is located above the second color filter CF2. The second pixel electrode PE2 is electrically connected to the drain electrode WD of the second switching element SW2. Likewise, the third pixel electrode PE3 is formed on the third insulation film 13, is located above the third color filter CF3, and is electrically connected to the drain electrode WD of the third switching element SW3.

Such the first pixel electrode PE1, the second pixel electrode PE2, and the third pixel electrode PE3 are formed of a conductive material having the optical transmission properties, for example, indium tin oxide (ITO), indium zinc oxide (IZO), and the like. The first pixel electrode PE1, the second pixel electrode PE2, and the third pixel electrode PE3 are covered by a first orientation film AL1.

The opposing substrate CT is formed by using a second insulation substrate 20 having the optical transmission properties, such as the glass substrate. The opposing substrate CT is provided with black matrixes BM on an inner face 20A of the second insulation substrate 20 opposed to the array substrate AR. The black matrixes BM are disposed so as to be opposed to the first switching element SW1, the second switching element SW2, the third switching element SW3, and the wirings such as the source wirings, the gate wirings, and auxiliary capacity wirings.

In the illustrated example, the opposing substrate CT is provided with a first coloring layer CF11, a second coloring layer CF12, and a third coloring layer CF13 on the inner face 20A of the second insulation substrate 20, but the first coloring layer CF11, the second coloring layer CF12, and the third coloring layer CF13 may be omitted. The first coloring layer CF11 is formed of the coloring resin transmitting the light in the first wavelength range (for example, a blue resin). The second coloring layer CF12 is formed of the coloring resin transmitting the light in the second wavelength range (for example, a green resin). The third coloring layer CF13 is formed of the coloring resin transmitting the light in the third wavelength range (for example, a red resin).

Also, in the illustrated example, the opposing substrate CT is provided with the common electrode CE on the faces of the first coloring layer CF11, the second coloring layer CF12, and the third coloring layer CF13 opposed to the array substrate AR. It should be noted that as described above, the common electrode CE may be provided on the array substrate AR. The common electrode CE like this is formed of, for example, the conductive material having the optical transmission properties such as ITO and IZO. The face of the opposing substrate CT opposed to the array substrate AR is covered by a second orientation film AL2.

The array substrate AR and the opposing substrate CT as described above are disposed so that the first orientation film AL1 of the array substrate AR and the second orientation film AL2 of the opposing substrate CT are opposed to each other. At this time, for example, a columnar spacer integrally formed with one of the substrates by the resin material is disposed between the array substrate AR and the opposing substrate CT, and a predetermined cell gap, for example, a cell gap of 2 to 7 µm, is formed.

The liquid crystal layer LQ is held by the cell gap formed between the array substrate AR and the opposing substrate CT, and is disposed between the first orientation film AL1 and the second orientation film AL2.

A first optical element OD1 including a first polarizer PL1 and the like is disposed on an outer face 10B of the first insulation substrate 10 configuring the array substrate AR. The first optical element OD1 is located on the side opposed to the backlight 4 of the liquid crystal display panel LPN, and controls the polarization state of incident light incident from the backlight 4 onto the liquid crystal display panel LPN.

A second optical element OD2 including a second polarizer PL2 and the like is disposed on an outer face 20B of the second insulation substrate 20 configuring the opposing substrate CT. The second optical element OD2 is located on the display face side of the liquid crystal display panel LPN, and controls the polarization state of exiting light exiting from the liquid crystal display panel LPN.

According to such the configuration, among the backlight lights emitted from the backlight 4, the transmission light from the liquid crystal display panel LPN in the optical path passing through the first pixel electrode PE1 via the first color filter CF1 exhibits the blue color (B), the transmission light from the liquid crystal display panel LPN in the optical path passing through the second pixel electrode PE2 via the second color filter CF2 exhibits the green color (G), and the transmission light from the liquid crystal display panel LPN in the optical path passing through the third pixel electrode PE3 via the third color filter CF3 exhibits the red color (R). It should be noted that almost all the lights that have not transmitted through the first color filter CF1, the second color filter CF2, and the third color filter CF3 are reflected, returned to the backlight 4 side, and reused. That is, the backlight 4 has a high reflectance face covering the light source and the like, and the reflection light reflected toward the backlight 4 is reflected toward the liquid crystal display panel LPN again on the high reflectance face with little optical loss. Thus, the reflection lights from the first color filter CF1, the second color filter CF2, and the third color filter CF3 are reused, so that the light utilization efficiency is improved.

Next, the more specific configuration examples of the first color filter CF1, the second color filter CF2, and the third color filter CF3 will be described.

Figure 4:
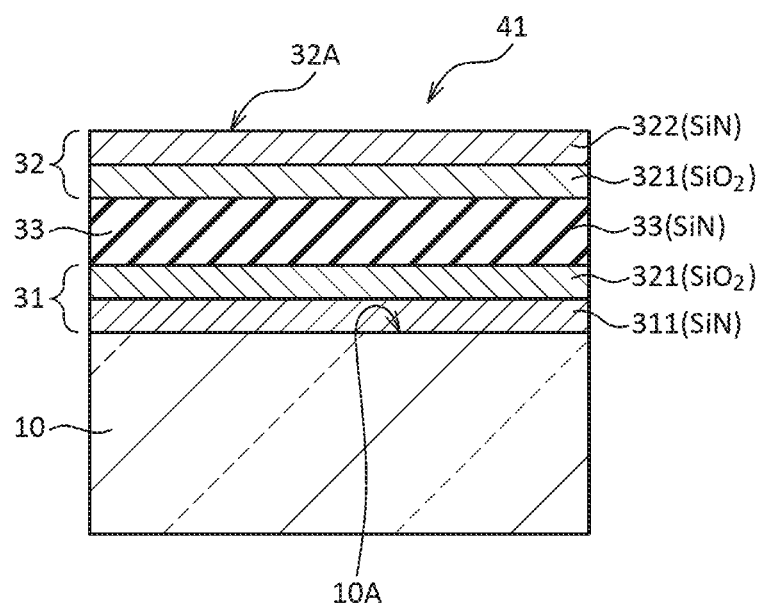
FIG. 4 is a cross-sectional view schematically illustrating a dielectric film stack body having a five-layer structure configuring a first color filter, a second color filter, and a third color filter.

FIG. 4 is a cross-sectional view schematically illustrating a dielectric film stack body 41 having a five-layer structure configuring the first color filter CF1, the second color filter CF2, and the third color filter CF3.

That is, the dielectric film stack body 41 is configured of a first silicon nitride layer 311 disposed on the inner face 10A of the first insulation substrate 10, a first silicon oxide layer 312 stacked on the first silicon nitride layer 311, a second silicon nitride layer 33 stacked on the first silicon oxide layer 312, a second silicon oxide layer 321 stacked on the second silicon nitride layer 33, and a third silicon nitride layer 322 stacked on the second silicon oxide layer 321.

The first silicon nitride layer 311 and the first silicon oxide layer 312 function as the first semi-transmissive layer 31. The second silicon nitride layer 33 functions as the transmissive layer 33. The second silicon oxide layer 321 and the third silicon nitride layer 322 function as the second semi-transmissive layer 32. That is, each of the first semi-transmissive layer 31 and the second semi-transmissive layer 32 is a two-layer dielectric stack body.

The first insulation substrate 10 is the glass substrate, and has a refraction index in the visible light wavelength range of approximately 1.5. The first silicon nitride layer 311, the second silicon nitride layer 33, and the third silicon nitride layer 322 are made of, for example, SiN, and have a refraction index in the visible light wavelength range on the order of 2.0 to 2.7. That is, each of the first silicon nitride layer 311, the second silicon nitride layer 33, and the third silicon nitride layer 322 functions as a high refraction index layer having a higher refraction index than the first insulation substrate 10. The first silicon oxide layer 312 and the second silicon oxide layer 321 are made of, for example, $SiO_2$, and have a refraction index in the visible light wavelength range of approximately 1.5. That is, each of the first silicon oxide layer 312 and the second silicon oxide layer 321 functions as a low refraction index layer having a lower refraction index than the high refraction index layer.

The first silicon nitride layer 311 and the third silicon nitride layer 322 have the same film thickness in each of the first color filter CF1, the second color filter CF2, and the third color filter CF3, and have a film thickness of, for example, 58 nm. The first silicon oxide layer 312 and the second silicon oxide layer 321 have the same film thickness in each of the first color filter CF1, the second color filter CF2, and the third color filter CF3, and have a film thickness of, for example, 92 nm. That is, the low refraction index layer configuring each of the first semi-transmissive layer 31 and the second semi-transmissive layer 32 is thicker than the high refraction index layer.

The film thickness of the second silicon nitride layer 33 is different in each of the first color filter CF1, the second color filter CF2, and the third color filter CF3. As an example, the film thickness T1 of the second silicon nitride layer 33 is approximately 85 nm in the first color filter CF1, the film thickness T2 of the second silicon nitride layer 33 is approximately 116 nm in the second color filter CF2, and the film thickness T3 of the second silicon nitride layer 33 is approximately 150 nm in the third color filter CF3.

The first color filter CF1 made of the dielectric film stack body 41 having such the configuration has a transmittance peak near 470 nm, and also has a reflectance bottom near such the wavelength. Likewise, the second color filter CF2 has the transmittance peak near 540 nm, and also has the reflectance bottom near such the wavelength, while having a high reflectance in the wavelength range other than such the wavelength. Likewise, the third color filter CF3 has the transmittance peak near 610 nm, and also has the reflectance bottom near such the wavelength, while having a high reflectance in the wavelength range other than such the wavelength.

The third silicon nitride layer 322 of the second color filter CF2 or the third color filter CF3 becomes the base of the silicon semiconductor layer. The silicon semiconductor layer has a high optical absorption coefficient in the short wavelength. On the other hand, the backlight combined with the liquid crystal display panel has a light emission spectrum having a high optical intensity in the relatively short wavelength. As described above, the second color filter CF2 or the third color filter CF3 disposed on the underlayer of the silicon semiconductor layer has a relatively high reflectance in the wavelength range of the short wavelength, and can thus prevent the optical absorption in the silicon semiconductor layer. Therefore, the switching element provided with such the silicon semiconductor layer can reduce optical leak current. This prevents crosstalk, flicker, and the like from being caused, and can provide the liquid crystal display device having good display quality.

Figure 5:
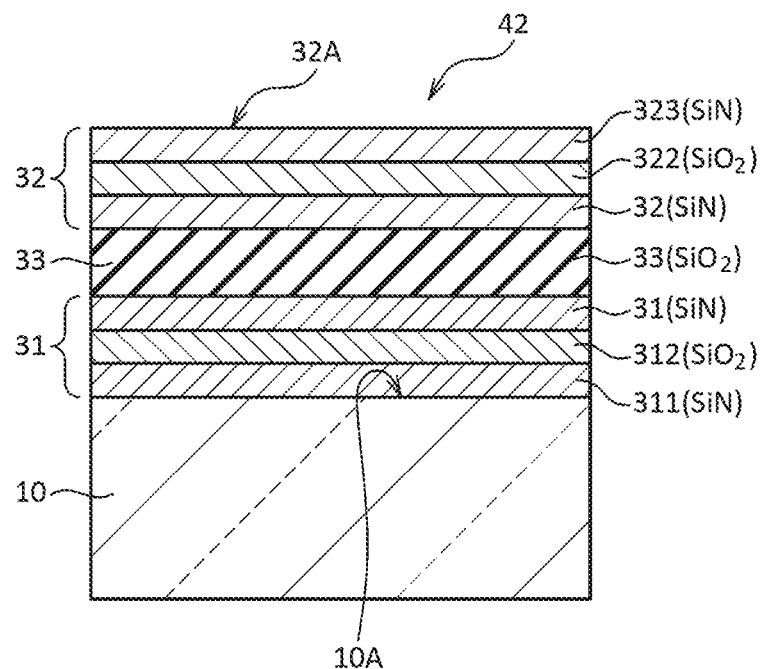
FIG. 5 is a cross-sectional view schematically illustrating a dielectric film stack body having a seven-layer structure configuring the first color filter, the second color filter, and the third color filter.

FIG. 5 is a cross-sectional view schematically illustrating a dielectric film stack body 42 having a seven-layer structure configuring the first color filter CF1, the second color filter CF2, and the third color filter CF3.

That is, the dielectric film stack body 42 is configured of a first silicon nitride layer 311 disposed on the inner face 10A of the first insulation substrate 10, a first silicon oxide layer 312 stacked on the first silicon nitride layer 311, a second silicon nitride layer 313 stacked on the first silicon oxide layer 312, a second silicon oxide layer 33 stacked on the second silicon nitride layer 313, a third silicon nitride layer 321 stacked on the second silicon oxide layer 33, a third silicon oxide layer 322 stacked on the third silicon nitride layer 321, and a fourth silicon nitride layer 323 stacked on the third silicon oxide layer 322.

The first silicon nitride layer 311, the first silicon oxide layer 312, and the second silicon nitride layer 313 function as the first semi-transmissive layer 31. The second silicon oxide layer 33 functions as the transmissive layer 33. The third silicon nitride layer 321, the third silicon oxide layer 322, and the fourth silicon nitride layer 323 function as the second semi-transmissive layer 32. That is, each of the first semi-transmissive layer 31 and the second semi-transmissive layer 32 is a three-layer dielectric stack body.

The first silicon nitride layer 311, the second silicon nitride layer 313, the third silicon nitride layer 321, and the fourth silicon nitride layer 323 are made of, for example, SiN, and function as the high refraction index layer (the refraction index in the visible light wavelength range is on the order of 2.0 to 2.7). The first silicon oxide layer 312, the second silicon oxide layer 33, and the third silicon oxide layer 322 are made of, for example, $SiO_2$, and function as the low refraction index layer (the refraction index in the visible light wavelength range is approximately 1.5).

The first silicon nitride layer 311, the second silicon nitride layer 313, the third silicon nitride layer 321, and the fourth silicon nitride layer 323 have the same film thickness in each of the first color filter CF1, the second color filter CF2, and the third color filter CF3, and have a film thickness of, for example, 58 nm. The first silicon oxide layer 312 and the third silicon oxide layer 322 have the same film thickness in each of the first color filter CF1, the second color filter CF2, and the third color filter CF3, and have a film thickness of, for example, 92 nm.

The film thickness of the second silicon oxide layer 33 is different in each of the first color filter CF1, the second color filter CF2, and the third color filter CF3. As an example, the film thickness T1 of the second silicon oxide layer 33 is approximately 130 nm in the first color filter CF1, the film thickness T2 of the second silicon oxide layer 33 is approximately 162 nm in the second color filter CF2, and the film thickness T3 of the second silicon oxide layer 33 is approximately 32 nm in the third color filter CF3.

The fourth silicon nitride layer 323 of the second color filter CF2 or the third color filter CF3 becomes the base of the silicon semiconductor layer.

The first color filter CF1 made of the dielectric film stack body 42 having such the configuration has the transmittance peak and the reflectance bottom near 470 nm, and as compared with the first color filter CF1 made of the dielectric film stack body 41, the wavelength range near the transmittance peak and the reflectance bottom is narrower, whereas the high reflectance wavelength range is wider. Likewise, the second color filter CF2 made of the dielectric film stack body 42 has the transmittance peak and the reflectance bottom near 540 nm, and as compared with the second color filter CF2 made of the dielectric film stack body 41, the wavelength range near the transmittance peak and the reflectance bottom is narrower, whereas the high reflectance wavelength range is wider. Likewise, the third color filter CF3 made of the dielectric film stack body 42 has the transmittance peak and the reflectance bottom near 610 nm, and as compared with the third color filter CF3 made of the dielectric film stack body 41, the wavelength range near the transmittance peak and the reflectance bottom is narrower, whereas the high reflectance wavelength range is wider.

In this way, by increasing the number of layers stacked of the dielectric film stack body, the wavelength range near the transmittance peak becomes narrower, so that the color purity of each of the first color filter CF1, the second color filter CF2, and the third color filter CF3 can be improved. Also, in the second color filter CF2 or the third color filter CF3 disposed on the underlayer of the silicon semiconductor layer, the high reflectance wavelength range is enlarged, so that the optical absorption in the silicon semiconductor layer can be further prevented. Therefore, the liquid crystal display device having better display quality can be provided.

Figure 6:
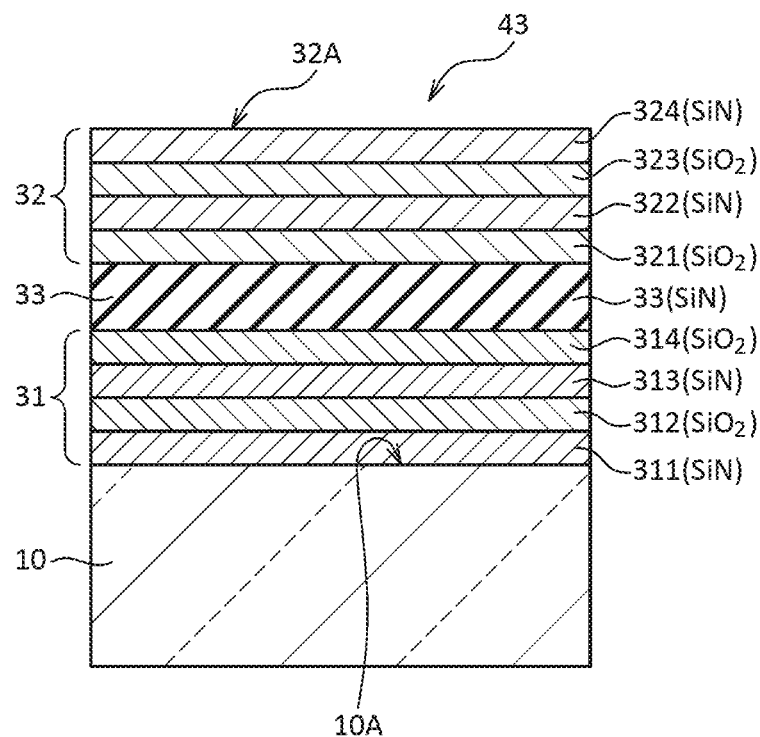
FIG. 6 is a cross-sectional view schematically illustrating a dielectric film stack body having a nine-layer structure configuring the first color filter, the second color filter, and the third color filter.

FIG. 6 is a cross-sectional view schematically illustrating a dielectric film stack body 43 having a nine-layer structure configuring the first color filter CF1, the second color filter CF2, and the third color filter CF3.

That is, the dielectric film stack body 43 is configured of a first silicon nitride layer 311 disposed on the inner face 10A of the first insulation substrate 10, a first silicon oxide layer 312 stacked on the first silicon nitride layer 311, a second silicon nitride layer 313 stacked on the first silicon oxide layer 312, a second silicon oxide layer 314 stacked on the second silicon nitride layer 313, a third silicon nitride layer 33 stacked on the second silicon oxide layer 314, a third silicon oxide layer 321 stacked on the third silicon nitride layer 33, a fourth silicon nitride layer 322 stacked on the third silicon oxide layer 321, a fourth silicon oxide layer 323 stacked on the fourth silicon nitride layer 322, and a fifth silicon nitride layer 324 stacked on the fourth silicon oxide layer 323.

The first silicon nitride layer 311, the first silicon oxide layer 312, the second silicon nitride layer 313, and the second silicon oxide layer 314 function as the first semi-transmissive layer 31. The third silicon nitride layer 33 functions as the transmissive layer 33. The third silicon oxide layer 321, the fourth silicon nitride layer 322, the fourth silicon oxide layer 323, and the fifth silicon nitride layer 324 function as the second semi-transmissive layer 32. That is, each of the first semi-transmissive layer 31 and the second semi-transmissive layer 32 is a four-layer dielectric stack body.

The first silicon nitride layer 311, the second silicon nitride layer 313, the third silicon nitride layer 33, the fourth silicon nitride layer 322, and the fifth silicon nitride layer 324 are made of, for example, SiN, and function as the high refraction index layer (the refraction index in the visible light wavelength range is on the order of 2.0 to 2.7). The first silicon oxide layer 312, the second silicon oxide layer 314, the third silicon oxide layer 321, and the fourth silicon oxide layer 323 are made of, for example, $SiO_2$, and function as the low refraction index layer (the refraction index in the visible light wavelength range is approximately 1.5).

The first silicon nitride layer 311, the second silicon nitride layer 313, the fourth silicon nitride layer 322, and the fifth silicon nitride layer 324 have the same film thickness in each of the first color filter CF1, the second color filter CF2, and the third color filter CF3, and have a film thickness of, for example, 58 nm. The first silicon oxide layer 312, the second silicon oxide layer 314, the third silicon oxide layer 321, and the fourth silicon oxide layer 323 have the same film thickness in each of the first color filter CF1, the second color filter CF2, and the third color filter CF3, and have a film thickness of, for example, 92 nm.

The film thickness of the third silicon nitride layer 33 is different in each of the first color filter CF1, the second color filter CF2, and the third color filter CF3. As an example, the film thickness T1 of the third silicon nitride layer 33 is approximately 78 nm in the first color filter CF1, the film thickness T2 of the third silicon nitride layer 33 is approximately 115 nm in the second color filter CF2, and the film thickness T3 of the third silicon nitride layer 33 is approximately 30 nm in the third color filter CF3.

The fifth silicon nitride layer 324 of the second color filter CF2 or the third color filter CF3 becomes the base of the silicon semiconductor layer.

The first color filter CF1 made of the dielectric film stack body 43 having such the configuration has the transmittance peak and the reflectance bottom near 470 nm, and as compared with the first color filter CF1 made of the dielectric film stack body 42, the wavelength range near the transmittance peak and the reflectance bottom is narrower, whereas the high reflectance wavelength range is wider. Likewise, the second color filter CF2 made of the dielectric film stack body 43 has the transmittance peak and the reflectance bottom near 540 nm, and as compared with the second color filter CF2 made of the dielectric film stack body 42, the wavelength range near the transmittance peak and the reflectance bottom is narrower, whereas the high reflectance wavelength range is wider. Likewise, the third color filter CF3 made of the dielectric film stack body 43 has the transmittance peak and the reflectance bottom near 610 nm, and as compared with the third color filter CF3 made of the dielectric film stack body 42, the wavelength range near the transmittance peak and the reflectance bottom is narrower, whereas the high reflectance wavelength range is wider.

Thus, the color purity of each of the first color filter CF1, the second color filter CF2, and the third color filter CF3 can be further improved. Also, the optical absorption in the silicon semiconductor layer can be further prevented. Therefore, the liquid crystal display device having better display quality can be provided.

It should be noted that the position of the reflectance bottom in the reflection spectrum or the position of the transmittance peak in the transmission spectrum of each of the first color filter CF1, the second color filter CF2, and the third color filter CF3 can be adjusted by changing the film thickness of the transmissive layer 33. While the required performance of the first color filter CF1, the second color filter CF2, and the third color filter CF3 and the optical leak resistance is considered, the number of layers and the film thickness of the transmissive layer can be decided.

(A Method of Manufacturing the Color Filters Having the Seven-Layer Structure)

Next, a method of manufacturing the semiconductor device configuring the display device 1 will be described with reference to FIGS. 7 to 16.

FIGS. 7 to 16 illustrate the method of manufacturing the semiconductor device including the first color filter CF1, the second color filter CF2, and the third color filter CF3 having the seven-layer structure illustrated in FIG. 5. In FIGS. 7 to 16, from the left side to the right side, the third color filter CF3, the first color filter CF1, and the second color filter CF2 are formed. The film thickness of each of the layers is the same as the film thickness described in FIG. 5, and the overlapped description thereof is omitted.

Figure 7:
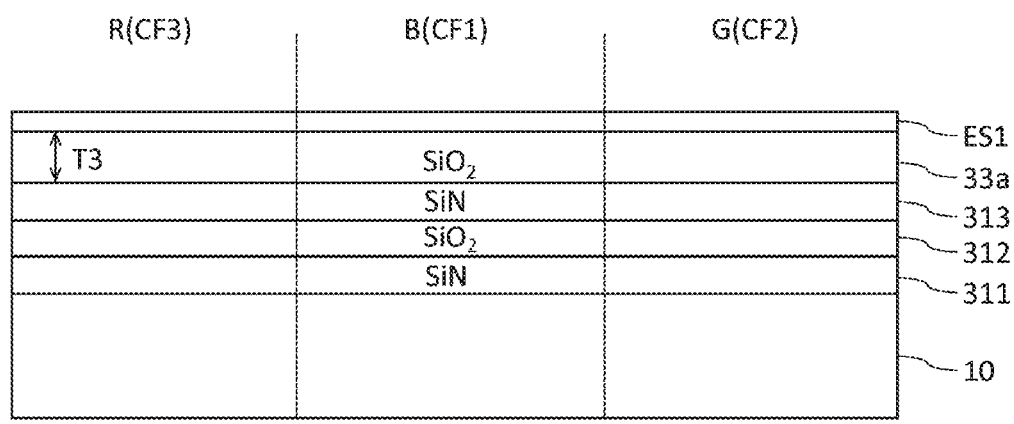
FIG. 7 is a cross-sectional view illustrating a state where a first semi-transmissive layer, a first film configuring part of a second silicon oxide layer, and an AIO film configuring a first etching stopper layer are successively stacked on a first insulation substrate.

FIG. 7 is a cross-sectional view illustrating a state where the first semi-transmissive layer 31, a first film 33*a* configuring part of the second silicon oxide layer 33, and the AIO film configuring the first etching stopper layer ES1 are successively stacked on the first insulation substrate 10.

The first semi-transmissive layer 31 is configured of the first silicon nitride layer 311, the first silicon oxide layer 312, and the second silicon nitride layer 313. The first silicon nitride layer 311 is formed on the first insulation substrate 10, the first silicon oxide layer 312 is formed on the first silicon nitride layer 311, and then, the second silicon nitride layer 313 is formed on the first silicon oxide layer 312.

Next, the first film 33*a* configuring part of the second silicon oxide layer 33 is formed on the second silicon nitride layer 313. The film thickness of the first film 33*a* is the third film thickness T3 of the third transmissive layer 333 configuring the third color filter CF3. Then, the AIO film configuring the first etching stopper layer ES1 is formed on the first film 33*a*. The film thickness of the first etching stopper layer ES1 is on the order of, for example, 10 nm to 20 nm.

Figure 8:
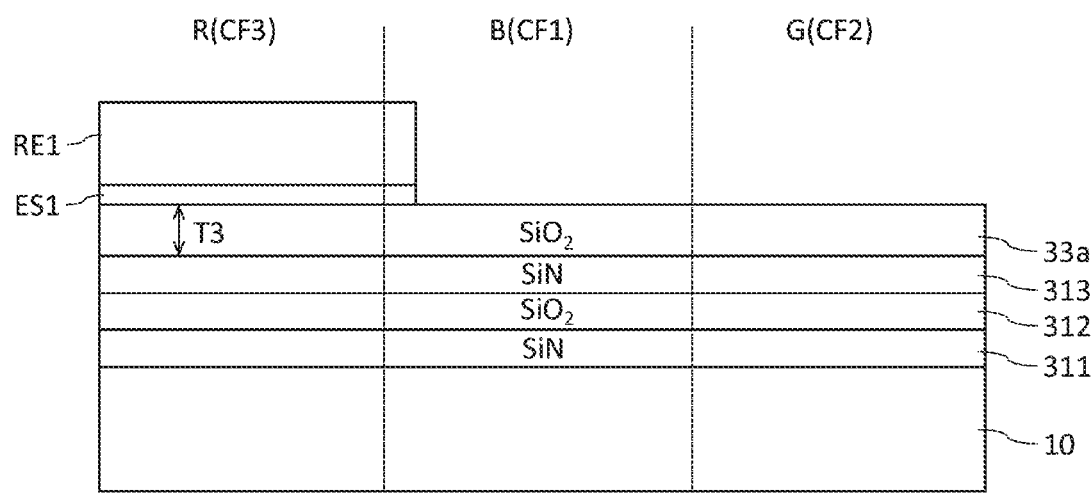
FIG. 8 is a cross-sectional view illustrating a state where the first etching stopper layer is selectively removed.

FIG. 8 is a cross-sectional view illustrating a state where the first etching stopper layer ES1 is selectively removed. First, a resist film RE1 is selectively formed on the first etching stopper layer ES1 located in the forming region of the third color filter CF3 and part of the forming region of the first color filter CF1 adjacent to the forming region of the third color filter CF3. That is, the first etching stopper layer ES1 is provided so as to be superposed or overlapped with part of the Sin forming region of the first color filter CF1 adjacent to the forming region of the third color filter CF3. The region in which the first etching stopper layer ES1 is overlapped with the forming region of the third color filter CF3 is the region located on the lower side of the black matrix BM, as described later.

Next, with the resist film RE1 as the etching mask, the first etching stopper layer ES1 exposed from the resist film RE1 is removed by using a hydrofluoric acid (HF) having a low concentration. The first etching stopper layer ES1 is configured of the AIO film, and is thus etched by the hydrofluoric acid (HF), but the first film 33*a* is $SiO_2$, and is thus not etched by the hydrofluoric acid (HF). The length of the first etching stopper layer ES1 located in part of the forming region of the first color filter CF1 is on the order of, for example, 5 μm to 10 μm.

Figure 9:
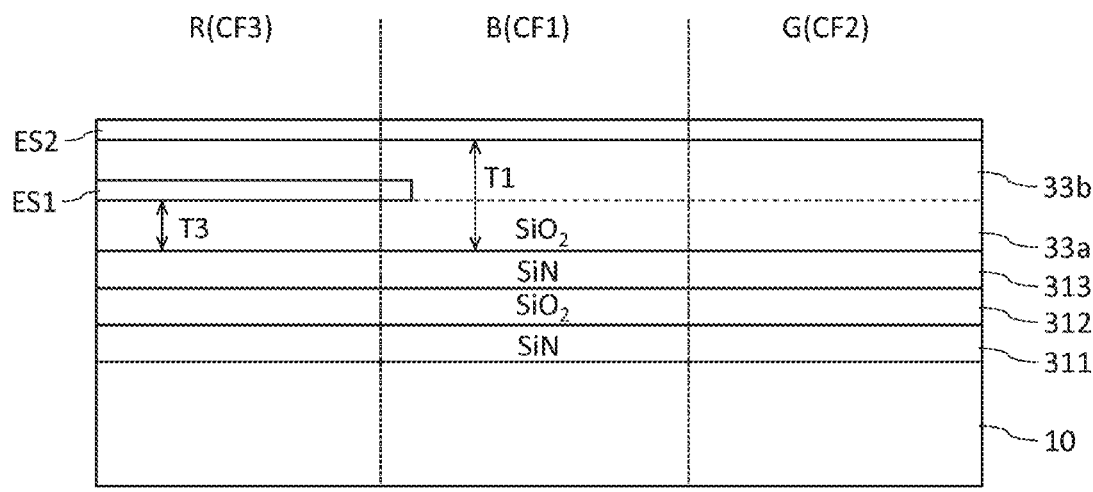
FIG. 9 is a cross-sectional view illustrating a state where a second film configuring part of the second silicon oxide layer is formed so as to cover the tops of the first etching stopper layer and the first film and a second etching stopper layer is stacked on the second film.

FIG. 9 is a cross-sectional view illustrating a state where a second film 33*b* configuring part of the second silicon oxide layer 33 is formed so as to cover the tops of the first etching stopper layer ES1 and the first film 33*a* and the second etching stopper layer ES2 is stacked on the second film 33*b*. First, the resist film RE1 is removed, and thereafter, the second film 33*b* configuring part of the second silicon oxide layer 33 is formed so as to cover the tops of the first etching stopper layer ES1 and the first film 33*a*. Next, the AIO film configuring the second etching stopper layer ES2 is formed on the second film 33*b*. The film thickness of the second etching stopper layer ES2 is on the order of, for example, 10 nm to 20 nm. The total film thickness of the film thickness of the second film 33*b* and the third film thickness T3 of the first film 33*a* becomes the first film thickness T1 of the first transmissive layer 331 configuring the first color filter CF1.

Figure 10:
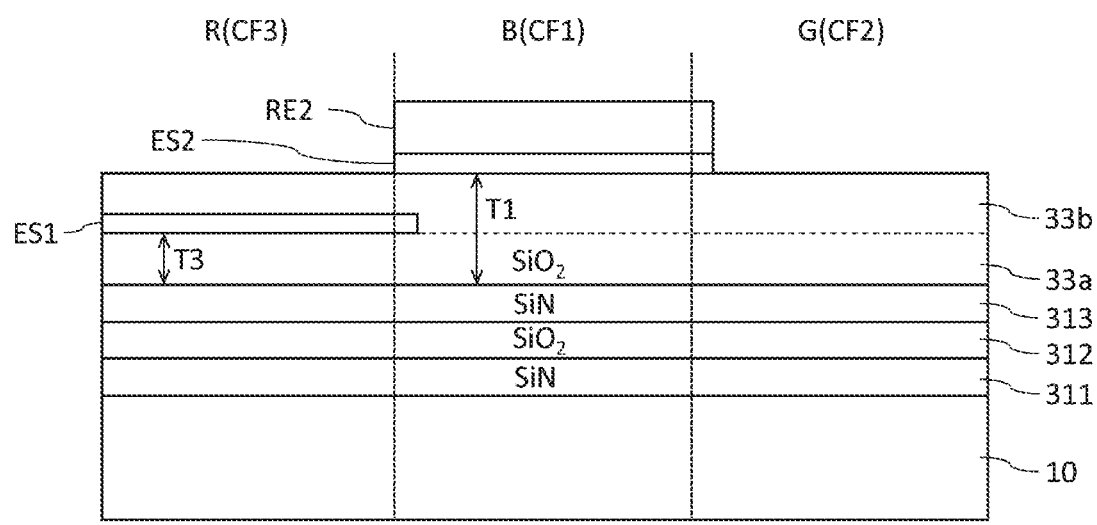
FIG. 10 is a cross-sectional view illustrating a state where the second etching stopper layer is selectively removed.

FIG. 10 is a cross-sectional view illustrating a state where the second etching stopper layer ES2 is selectively removed. A resist film RE2 is selectively formed on the second etching stopper layer ES2 located in the forming region of the first color filter CF1 and part of the forming region of the second color filter CF2 adjacent to the forming region of the first color filter CF1. That is, the second etching stopper layer ES2 is provided so as to be superposed or overlapped with part of the Sin forming region of the second color filter CF2 adjacent to the forming region of the first color filter CF1. The region in which the second etching stopper layer ES2 is overlapped with the forming region of the second color filter CF2 is the region located on the lower side of the black matrix BM, as described later. Also, the first etching stopper layer ES1 and the second etching stopper layer ES2 are provided so as to be partially superposed or overlapped at the end of the forming region of the first color filter CF1 in cross-sectional view or in top view.

Next, with the resist film RE2 as the etching mask, the second etching stopper layer ES2 exposed from the resist film RE2 is removed by using the hydrofluoric acid (HF) having a low concentration. The second etching stopper layer ES2 is the AIO film, and is thus etched by the hydrofluoric acid (HF), but the second film 33*b* is $SiO_2$, and is thus not etched by the hydrofluoric acid (HF). The length of the second etching stopper layer ES2 located in part of the forming region of the second color filter CF2 is on the order of, for example, 5 μm to 10 μm.

Figure 11:
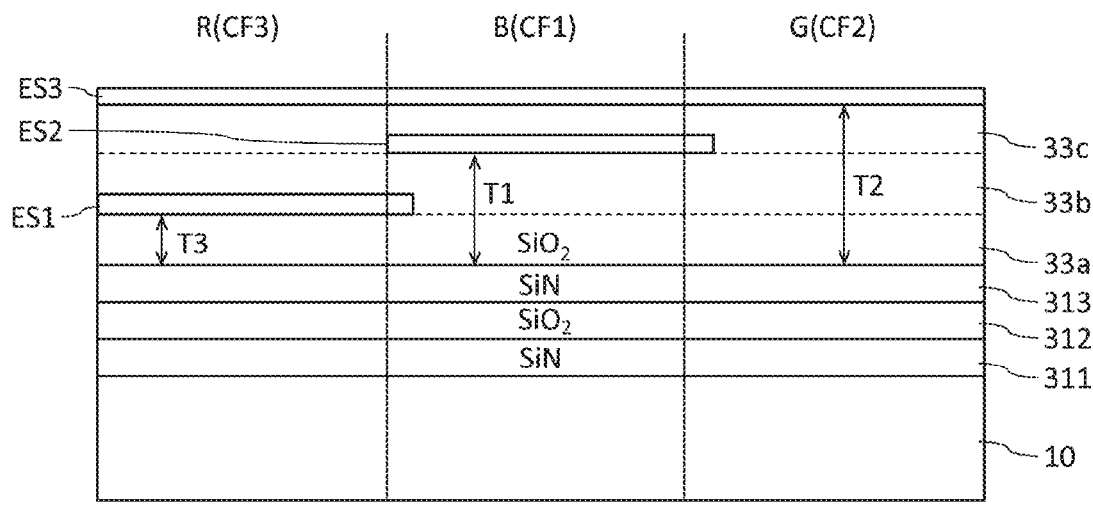
FIG. 11 is a cross-sectional view illustrating a state where a third film configuring part of the second silicon oxide layer is formed so as to cover the tops of the second etching stopper layer and the second film and a third etching stopper layer is stacked on the third film.

FIG. 11 is a cross-sectional view illustrating a state where a third film 33*c* configuring part of the second silicon oxide layer 33 is formed so as to cover the tops of the second etching stopper layer ES2 and the second film 33*b* and a third etching stopper layer ES3 is stacked on the third film 33*c*. First, the resist film RE2 is removed, and thereafter, the third film 33*c* configuring part of the second silicon oxide layer 33 is formed so as to cover the tops of the second etching stopper layer ES2 and the second film 33*b*. Next, the AIO film configuring the third etching stopper layer ES3 is formed on the third film 33*c*. The film thickness of the third etching stopper layer ES3 is on the order of, for example, 10 nm to 20 nm. The total film thickness of the film thickness of the third film 33*c*, the film thickness of the second film 33*b*, and the third film thickness T3 of the first film 33*a* becomes the second film thickness T2 of the second transmissive layer 332 configuring the second color filter CF2.

Figure 12:
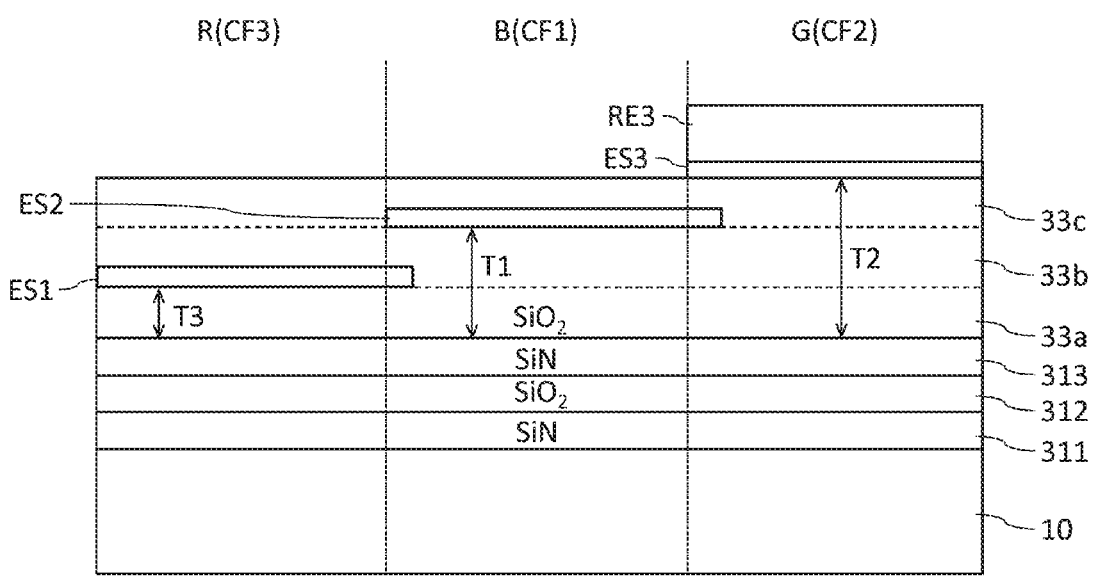
FIG. 12 is a cross-sectional view illustrating a state where the third etching stopper layer is selectively removed.

FIG. 12 is a cross-sectional view illustrating a state where the third etching stopper layer ES3 is selectively removed. First, a resist film RE3 is selectively formed on the third etching stopper layer ES3 located in the forming region of the second color filter CF2. The second etching stopper layer ES2 and the third etching stopper layer ES3 are provided so as to be superposed or overlapped at the end of the forming region of the second color filter CF2 in top view.

Next, with the resist film RE3 as the etching mask, the third etching stopper layer ES3 exposed from the resist film RE3 is removed by using the hydrofluoric acid (HF) having a low concentration. The third etching stopper layer ES3 is the AIO film, and is thus etched by the hydrofluoric acid (HF), but the third film 33c is SiO$_2$, and is thus not etched by the hydrofluoric acid (HF).

Figure 13:
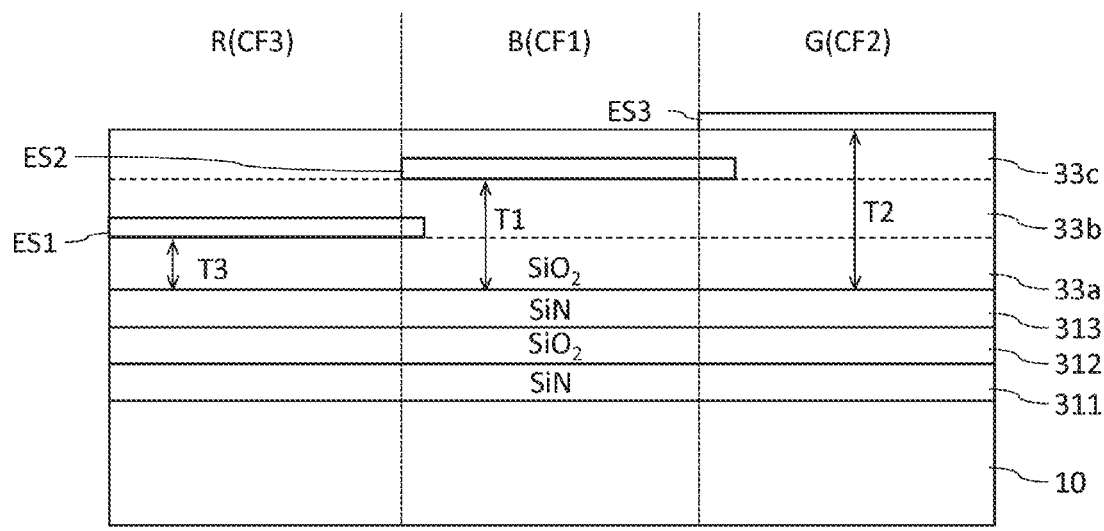
FIG. 13 is a cross-sectional view illustrating a state where a resist film is removed.

FIG. 13 is a cross-sectional view illustrating a state where the resist film RE3 is removed. The resist film RE3 on the third etching stopper layer ES3 is removed.

Figure 14:
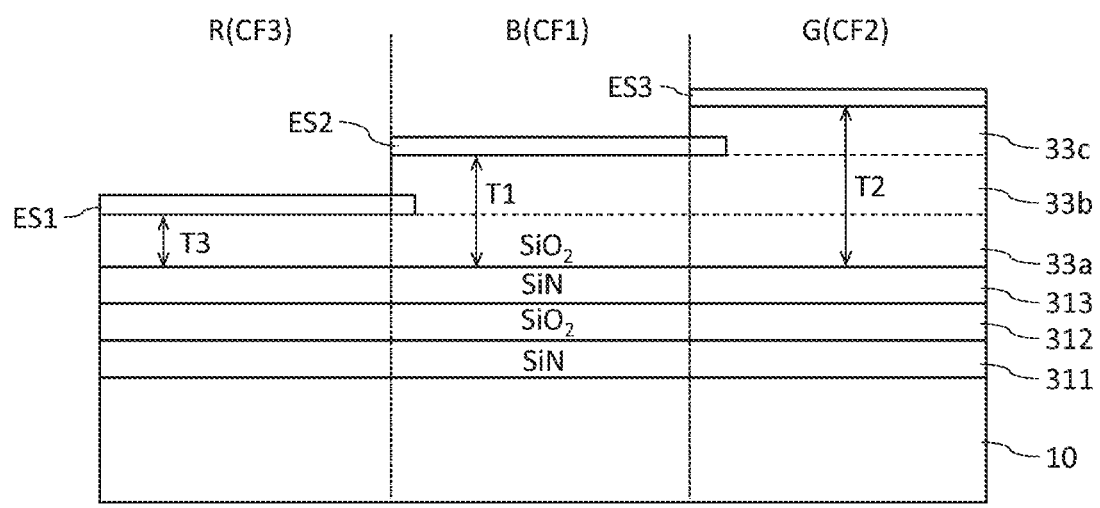
FIG. 14 is a cross-sectional view illustrating a state where dry etching is performed with the first etching stopper layer, the second etching stopper layer, and the third etching stopper layer as etching masks.

FIG. 14 is a cross-sectional view illustrating a state where the dry etching is performed with the first etching stopper layer ES1, the second etching stopper layer ES2, and the third etching stopper layer ES3 as the etching masks. In a first removing step, the dry etching is performed with the first etching stopper layer ES1, the second etching stopper layer ES2, and the third etching stopper layer ES3 as the etching masks and with fluorine (F) as an etching gas. From this, the second film 33b and the third film 33c formed on the first etching stopper layer ES1 in the forming region of the third color filter CF3 are etched, and also, the third film 33c formed on the second etching stopper layer ES2 in the forming region of the first color filter CF1 is etched. On the other hand, the first etching stopper layer ES1, the second etching stopper layer ES2, and the third etching stopper layer ES3 are not etched by the dry etching using the fluorine (F), and remain as they are. That is, the etching rate of the dry etching of the first etching stopper layer ES1, the second etching stopper layer ES2, and the third etching stopper layer ES3 is lower than the etching rate of the dry etching of the second film 33b and the third film 33c configuring the second silicon oxide layer 33 that is the transmissive layer. By overlapping the first etching stopper layer ES1 with the second etching stopper layer ES2, a hole can be prevented from being opened by the dry etching between the third transmissive layer 333 having the third film thickness T3 configuring the third color filter CF3 and the first transmissive layer 331 having the first film thickness T1 configuring the first color filter CF1. Likewise, by overlapping the second etching stopper layer ES2 with the third etching stopper layer ES3, a hole can be prevented from being opened by the dry etching between the first transmissive layer 331 having the first film thickness T1 configuring the first color filter CF1 and the second transmissive layer 332 having the second film thickness T2 configuring the second color filter CF2.

Figure 15:
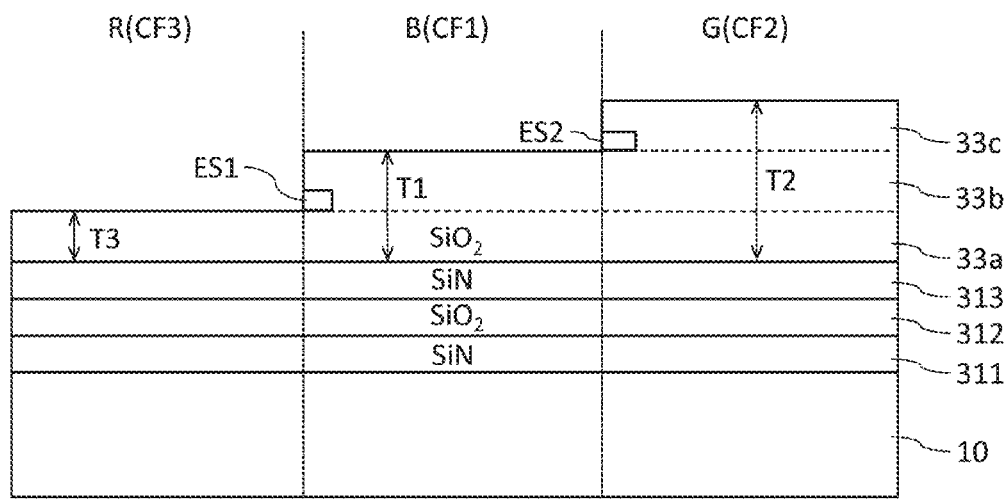
FIG. 15 is a cross-sectional view illustrating a state where the first etching stopper layer, the second etching stopper layer, and the third etching stopper layer are selectively removed.

FIG. 15 is a cross-sectional view illustrating a state where the first etching stopper layer ES1, the second etching stopper layer ES2, and the third etching stopper layer ES3 are selectively removed. In a second removing step, the first etching stopper layer ES1, the second etching stopper layer ES2, and the third etching stopper layer ES3 are selectively removed by using a cleaning solution using the hydrofluoric acid (HF) having a low concentration as an etching solution. The AIO films configuring the first etching stopper layer ES1, the second etching stopper layer ES2, and the third etching stopper layer ES3 are melted by the hydrofluoric acid (HF) having a low concentration, whereby the first etching stopper layer ES1, the second etching stopper layer ES2, and the third etching stopper layer ES3 can be selectively removed. The first etching stopper layer ES1 in the forming region of the first color filter CF1 and the second etching stopper layer ES2 in the forming region of the second color filter CF2 remain as they are without being etched. On the other hand, the first film 33a, the second film 33b, and the third film 33c are SiO$_2$, and are thus not etched by the hydrofluoric acid (HF) having a low concentration. Therefore, the third film thickness T3 of the third transmissive layer 333 configuring the third color filter CF3, the first film thickness T1 of the first transmissive layer 331 configuring the first color filter CF1, and the second film thickness T2 of the second transmissive layer 332 configuring the second color filter CF2 can be precisely made uniform in the plane of the array substrate.

Figure 16:
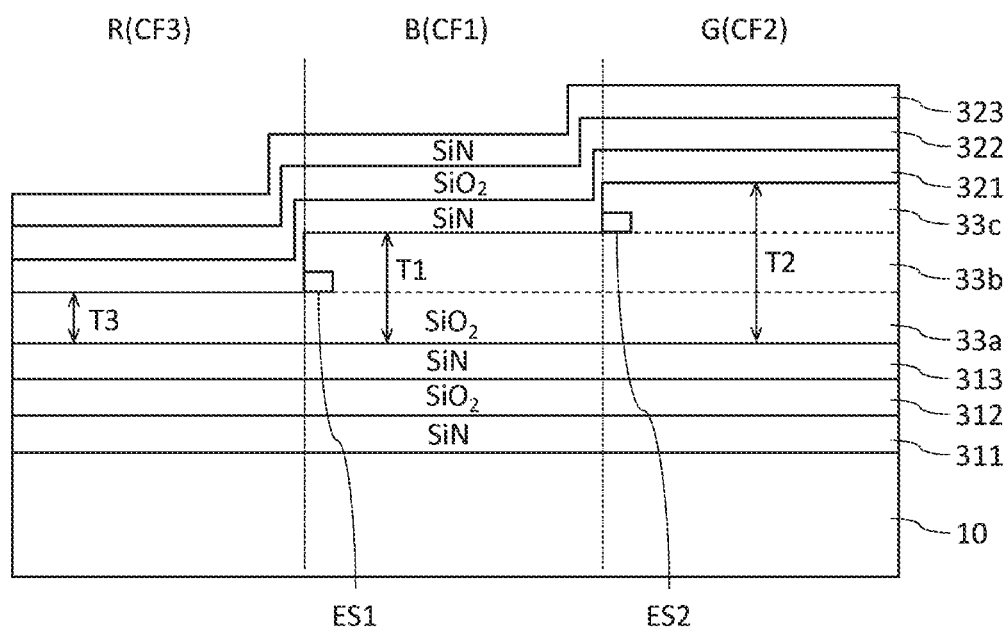
FIG. 16 is a cross-sectional view illustrating a state where a second semi-transmissive layer is formed on the first film, the second film, and the third film configuring the second silicon oxide layer.

FIG. 16 is a cross-sectional view illustrating a state where the second semi-transmissive layer 32 is formed on the first film 33a, the second film 33b, and the third film 33c configuring the second silicon oxide layer 33. The second semi-transmissive layer 32 is configured of the third silicon nitride layer 321, the third silicon oxide layer 322, and the fourth silicon nitride layer 323. The third silicon nitride layer 321 is formed on the first film 33a, the second film 33b, and the third film 33c configuring the second silicon oxide layer 33. Then, the third silicon oxide layer 322 is formed on the third silicon nitride layer 321. Thereafter, the fourth silicon nitride layer 323 is formed on the third silicon oxide layer 322.

By the above manufacturing steps, the film thickness T1 of the transmissive layer (interference layer) configuring the color filter CF1 corresponding to the blue color, the film thickness T2 of the transmissive layer (interference layer) configuring the color filter CF2 corresponding to the green color, and the film thickness T3 of the transmissive layer (interference layer) configuring the color filter CF3 corresponding to the red color can be precisely made uniform in the plane of the array substrate. After the step illustrated in FIG. 16, the manufacturing steps of the respective switching elements configuring the first pixel PX1 displaying the blue color, the second pixel PX2 displaying the green color, and the third pixel PX3 displaying the red color illustrated in FIG. 3 are executed.

(The Manufacturing Steps of the Color Filters Having the Nine-Layer Structure)

Next, the method of manufacturing the semiconductor device configuring the display device 1 will be described with reference to FIGS. 17 to 26.

FIGS. 17 to 26 illustrate the method of manufacturing the semiconductor device including the first color filter CF1, the second color filter CF2, and the third color filter CF3 having the nine-layer structure illustrated in FIG. 6. In FIGS. 17 to 26, from the left side to the right side, the third color filter CF3, the first color filter CF1, and the second color filter CF2 are formed. The film thickness of each of the layers is the same as the film thickness described in FIG. 6, and the overlapped description thereof is omitted.

Figure 17:
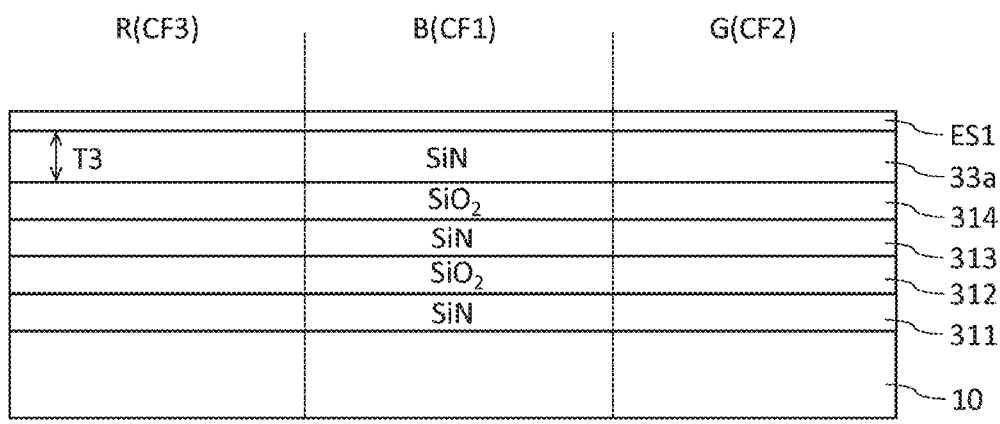
FIG. 17 is a cross-sectional view illustrating a state where the first semi-transmissive layer, the first film configuring part of a third silicon nitride layer, and the AIO film configuring the first etching stopper layer are successively stacked on the first insulation substrate.

FIG. 17 is a cross-sectional view illustrating a state where the first semi-transmissive layer 31, the first film 33a configuring part of the third silicon nitride layer 33, and the AIO film configuring the first etching stopper layer ES1 are successively stacked on the first insulation substrate 10.

The first semi-transmissive layer 31 is configured of the first silicon nitride layer 311, the first silicon oxide layer 312, the second silicon nitride layer 313, and the second silicon oxide layer 314. The first silicon nitride layer 311 is formed on the first insulation substrate 10, and the first silicon oxide layer 312 is formed on the first silicon nitride layer 311. Then, the second silicon nitride layer 313 is formed on the first silicon oxide layer 312, and the second silicon oxide layer 314 is formed on the second silicon nitride layer 313.

Thereafter, the first film 33a configuring part of the third silicon nitride layer 33 is formed on the second silicon oxide layer 314. The film thickness of the first film 33a is the third film thickness T3 of the third transmissive layer 333 configuring the third color filter CF3. Then, the first etching stopper layer ES1 is formed on the first film 33a by the AIO film. The film thickness of the first etching stopper layer ES1 is on the order of, for example, 10 nm to 20 nm.

Figure 18:
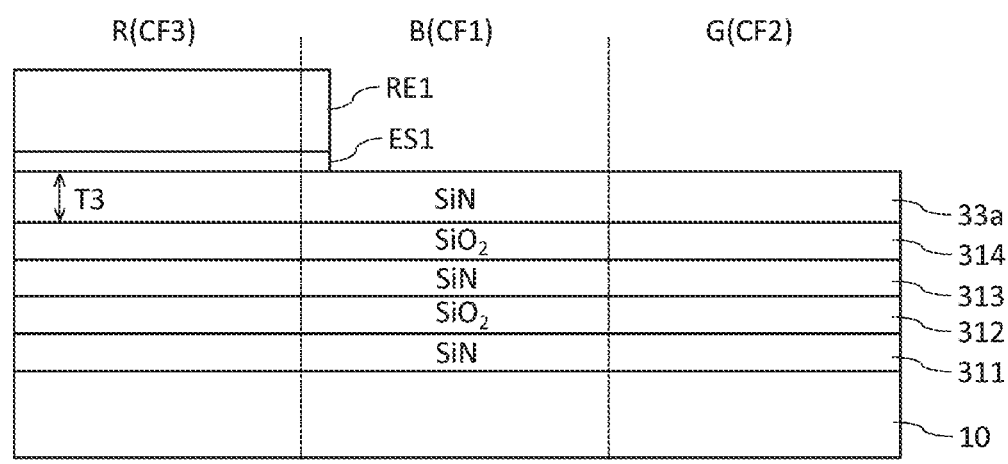
FIG. 18 is a cross-sectional view illustrating a state where the first etching stopper layer is selectively removed.

FIG. 18 is a cross-sectional view illustrating a state where the first etching stopper layer ES1 is selectively removed. First, the resist film RE1 is selectively formed on the first etching stopper layer ES1 located in the forming region of the third color filter CF3 and part of the forming region of the first color filter CF1 adjacent to the forming region of the third color filter CF3. That is, the first etching stopper layer ES1 is provided so as to be superposed or overlapped with part of the Sin forming region of the first color filter CF1 adjacent to the forming region of the third color filter CF3. The region in which the first etching stopper layer ES1 is overlapped with the forming region of the third color filter CF3 is the region located on the lower side of the black matrix BM, as described later.

Next, with the resist film RE1 as the etching mask, the first etching stopper layer ES1 exposed from the resist film RE1 is removed by using the developing solution of the resist film. The first etching stopper layer ES1 is configured of the AIO film, and is thus etched by the developing solution, but the first film 33a is SiN, and is thus not etched by the developing solution. The length of the first etching stopper layer ES1 located in part of the forming region of the first color filter CF1 is on the order of, for example, 5 µm to 10 µm.

Figure 19:
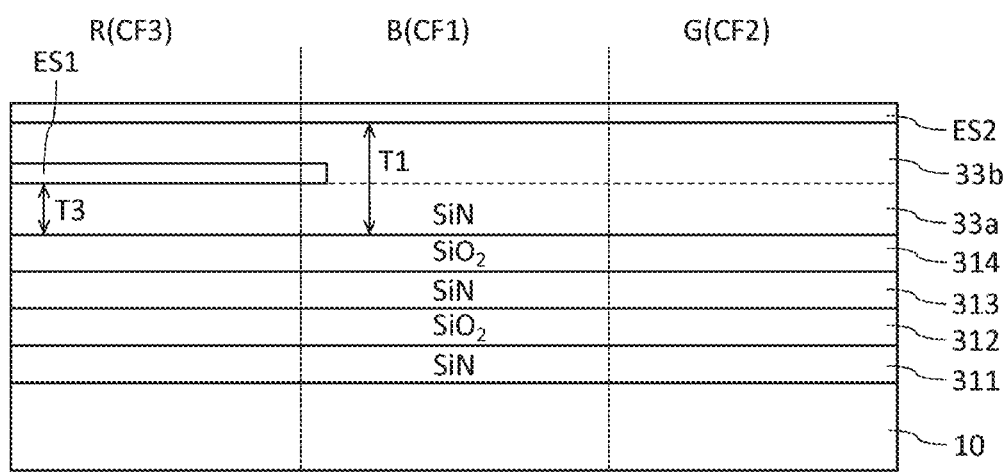
FIG. 19 is a cross-sectional view illustrating a state where the second film configuring part of the third silicon nitride layer is formed so as to cover the tops of the first etching stopper layer and the first film and the second etching stopper layer is stacked on the second film.

FIG. 19 is a cross-sectional view illustrating a state where the second film 33b configuring part of the third silicon nitride layer 33 is formed so as to cover the tops of the first etching stopper layer ES1 and the first film 33a and the second etching stopper layer ES2 is stacked on the second film 33b. First, the resist film RE1 is removed, and thereafter, the second film 33b configuring part of the third silicon nitride layer 33 is formed so as to cover the tops of the first etching stopper layer ES1 and the first film 33a. Next, the AIO film configuring the second etching stopper layer ES2 is formed on the second film 33b. The film thickness of the second etching stopper layer ES2 is on the order of, for example, 10 nm to 20 nm. The total film thickness of the film thickness of the second film 33b and the third film thickness T3 of the first film 33a becomes the first film thickness T1 of the first transmissive layer 331 configuring the first color filter CF1.

Figure 20:
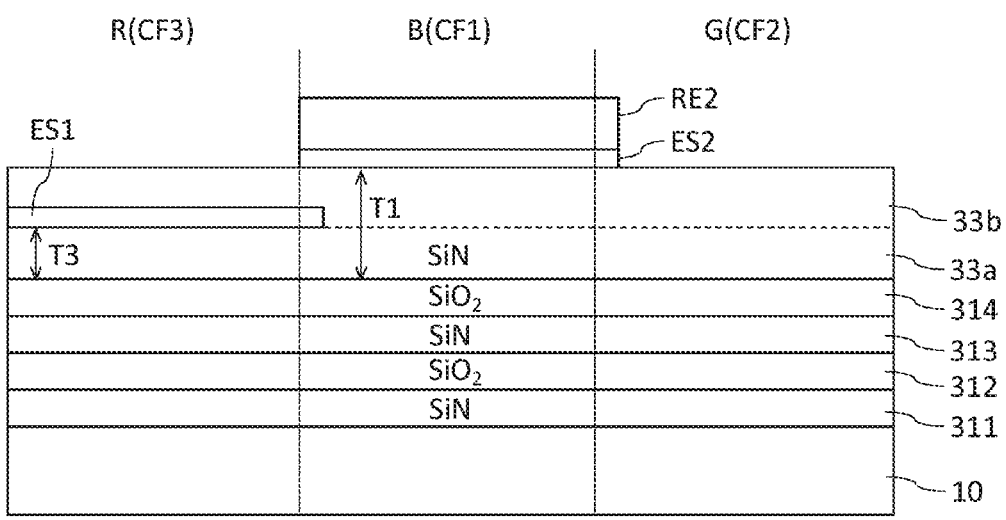
FIG. 20 is a cross-sectional view illustrating a state where the second etching stopper layer is selectively removed.

FIG. 20 is a cross-sectional view illustrating a state where the second etching stopper layer ES2 is selectively removed. The resist film RE2 is selectively formed on the second etching stopper layer ES2 located in the forming region of the first color filter CF1 and part of the forming region of the second color filter CF2 adjacent to the forming region of the first color filter CF1. That is, the second etching stopper layer ES2 is provided so as to be superposed or overlapped with part of the Sin forming region of the second color filter CF2 adjacent to the forming region of the first color filter CF1. The region in which the second etching stopper layer ES2 is overlapped with the forming region of the second color filter CF2 is the region located on the lower side of the black matrix BM, as described later. Also, the first etching stopper layer ES1 and the second etching stopper layer ES2 are provided so as to be superposed or overlapped at the end of the forming region of the first color filter CF1 in top view.

Next, with the resist film RE2 as the etching mask, the second etching stopper layer ES2 exposed from the resist film RE2 is removed by using the developing solution of the resist film. The second etching stopper layer ES2 is the AIO film, and is thus etched by the developing solution, but the second film 33b is SiN, and is thus not etched by the developing solution. The length of the second etching stop-per layer ES2 located in part of the forming region of the second color filter CF2 is on the order of, for example, 5 µm to 10 µm.

Figure 21:
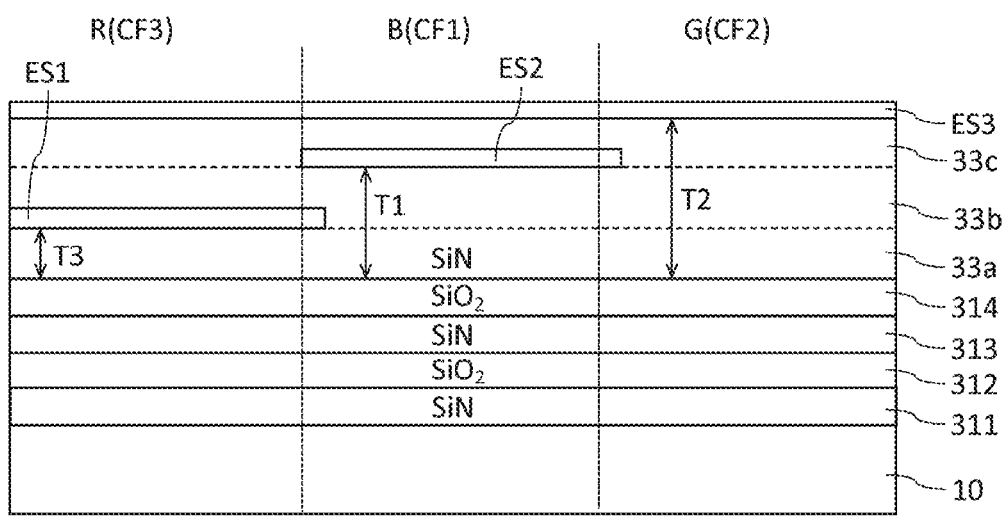
FIG. 21 is a cross-sectional view illustrating a state where the third film configuring part of the third silicon nitride layer is formed so as to cover the tops of the second etching stopper layer and the second film and the third etching stopper layer is stacked on the third film.

FIG. 21 is a cross-sectional view illustrating a state where the third film 33c configuring part of the third silicon nitride layer 33 is formed so as to cover the tops of the second etching stopper layer ES2 and the second film 33b and the third etching stopper layer ES3 is stacked on the third film 33c. First, the resist film RE2 is removed, and thereafter, the third film 33c configuring part of the third silicon nitride layer 33 is formed so as to cover the tops of the second etching stopper layer ES2 and the second film 33b. Next, the AIO film configuring the third etching stopper layer ES3 is formed on the third film 33c. The film thickness of the third etching stopper layer ES3 is on the order of, for example, 10 nm to 20 nm. The total film thickness of the film thickness of the third film 33c, the film thickness of the second film 33b, and the third film thickness T3 of the first film 33a becomes the second film thickness T2 of the second transmissive layer 332 configuring the second color filter CF2.

Figure 22:
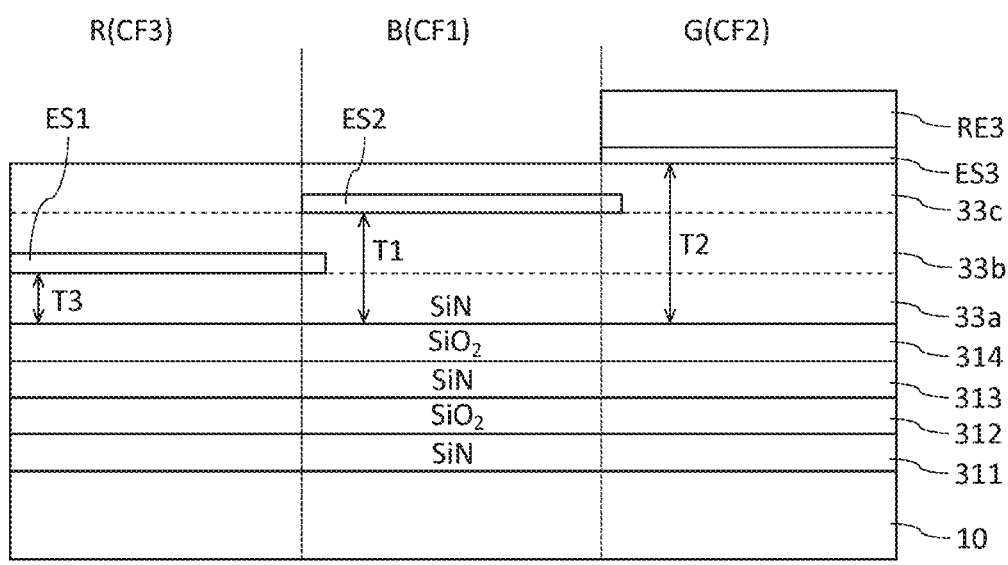
FIG. 22 is a cross-sectional view illustrating a state where the third etching stopper layer is selectively removed.

FIG. 22 is a cross-sectional view illustrating a state where the third etching stopper layer ES3 is selectively removed. First, the resist film RE3 is selectively formed on the third etching stopper layer ES3 located in the forming region of the second color filter CF2. At this time, with the resist film RE3 as the etching mask, the third etching stopper layer ES3 exposed from the resist film RE3 can be removed by using the developing solution of the resist film RE3. The third etching stopper layer ES3 is the AIO film, and is thus etched by the developing solution of the resist film RE3, but the third film 33c is SiN, and is thus not etched by the developing solution. The second etching stopper layer ES2 and the third etching stopper layer ES3 are provided so as to be superposed or overlapped at the end of the forming region of the second color filter CF2 in top view.

Figure 23:
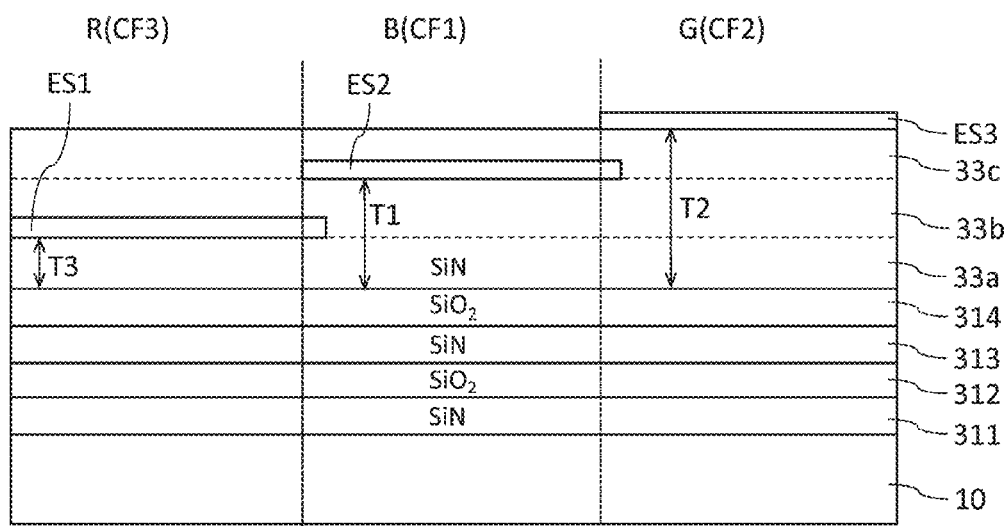
FIG. 23 is a cross-sectional view illustrating a state where the resist film is removed.

FIG. 23 is a cross-sectional view illustrating a state where the resist film RE3 is removed. The resist film RE3 on the third etching stopper layer ES3 is removed.

Figure 24:
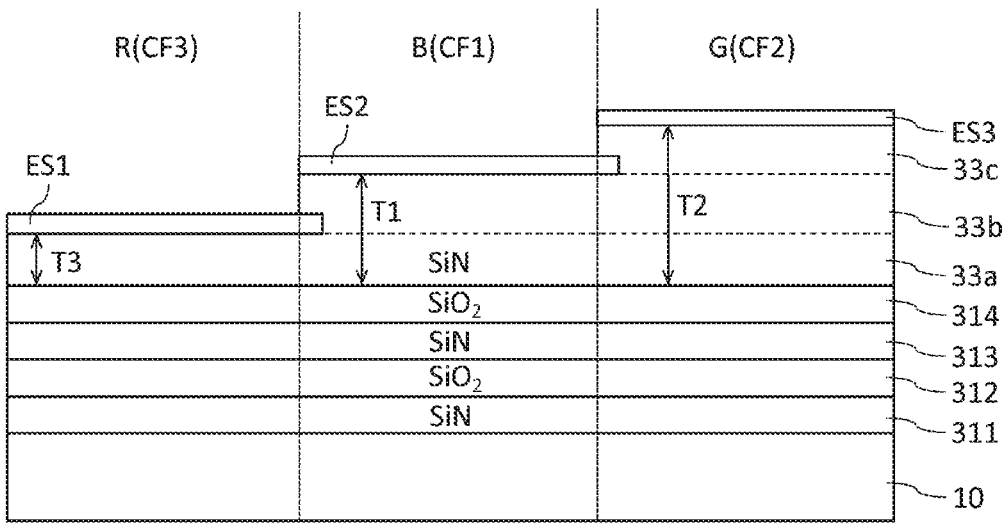
FIG. 24 is a cross-sectional view illustrating a state where the dry etching is performed with the first etching stopper layer, the second etching stopper layer, and the third etching stopper layer as the etching masks.

FIG. 24 is a cross-sectional view illustrating a state where the dry etching is performed with the first etching stopper layer ES1, the second etching stopper layer ES2, and the third etching stopper layer ES3 as the etching masks. In the first removing step, the dry etching is performed with the first etching stopper layer ES1, the second etching stopper layer ES2, and the third etching stopper layer ES3 as the etching masks and with the fluorine (F) as the etching gas. From this, the second film 33b and the third film 33c formed on the first etching stopper layer ES1 in the forming region of the third color filter CF3 are etched, and also, the third film 33c formed on the second etching stopper layer ES2 in the forming region of the first color filter CF1 is etched. On the other hand, the first etching stopper layer ES1, the second etching stopper layer ES2, and the third etching stopper layer ES3 are not etched by the dry etching using the fluorine (F), and remain as they are. That is, the etching rate of the dry etching of the first etching stopper layer ES1, the second etching stopper layer ES2, and the third etching stopper layer ES3 is lower than the etching rate of the dry etching of the second film 33b and the third film 33c configuring the third silicon nitride layer 33 that is the transmissive layer. By overlapping the first etching stopper layer ES1 with the second etching stopper layer ES2, a hole can be prevented from being opened by the dry etching between the third transmissive layer 333 having the third film thickness T3 configuring the third color filter CF3 and the first transmissive layer 331 having the first film thickness T1 configuring the first color filter CF1. Likewise, by overlapping the second etching stopper layer ES2 with the third etching stopper layer ES3, a hole can be prevented from being opened by the dry etching between the first transmissive layer 331 having the first film thickness T1 configuring the first color filter CF1 and the second transmissive layer 332 having the second film thickness T2 configuring the second color filter CF2.

Figure 25:
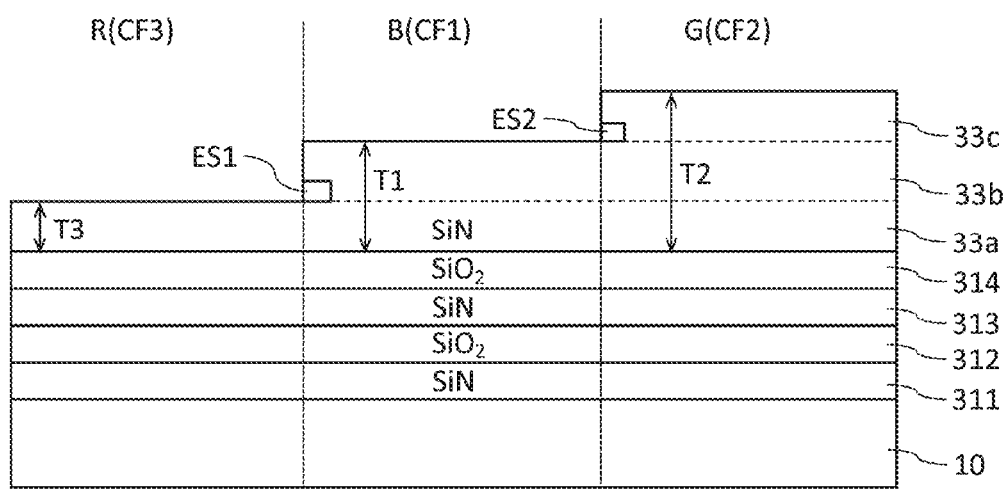
FIG. 25 is a cross-sectional view illustrating a state where the first etching stopper layer, the second etching stopper layer, and the third etching stopper layer are selectively removed.

FIG. 25 is a cross-sectional view illustrating a state where the first etching stopper layer ES1, the second etching stopper layer ES2, and the third etching stopper layer ES3 are selectively removed. In the second removing step, the first etching stopper layer ES1, the second etching stopper layer ES2, and the third etching stopper layer ES3 are selectively removed by using the developing solution of the resist film. The AlO films configuring the first etching stopper layer ES1, the second etching stopper layer ES2, and the third etching stopper layer ES3 are melted by the developing solution, whereby the first etching stopper layer ES1, the second etching stopper layer ES2, and the third etching stopper layer ES3 can be selectively removed. The first etching stopper layer ES1 in the forming region of the first color filter CF1 and the second etching stopper layer ES2 in the forming region of the second color filter CF2 remain as they are without being etched. On the other hand, the first film 33a, the second film 33b, and the third film 33c are SiN, and are thus not etched by the developing solution. Therefore, the third film thickness T3 of the third transmissive layer 333 configuring the third color filter CF3, the first film thickness T1 of the first transmissive layer 331 configuring the first color filter CF1, and the second film thickness T2 of the second transmissive layer 332 configuring the second color filter CF2 can be precisely made uniform in the plane of the array substrate.

Figure 26:
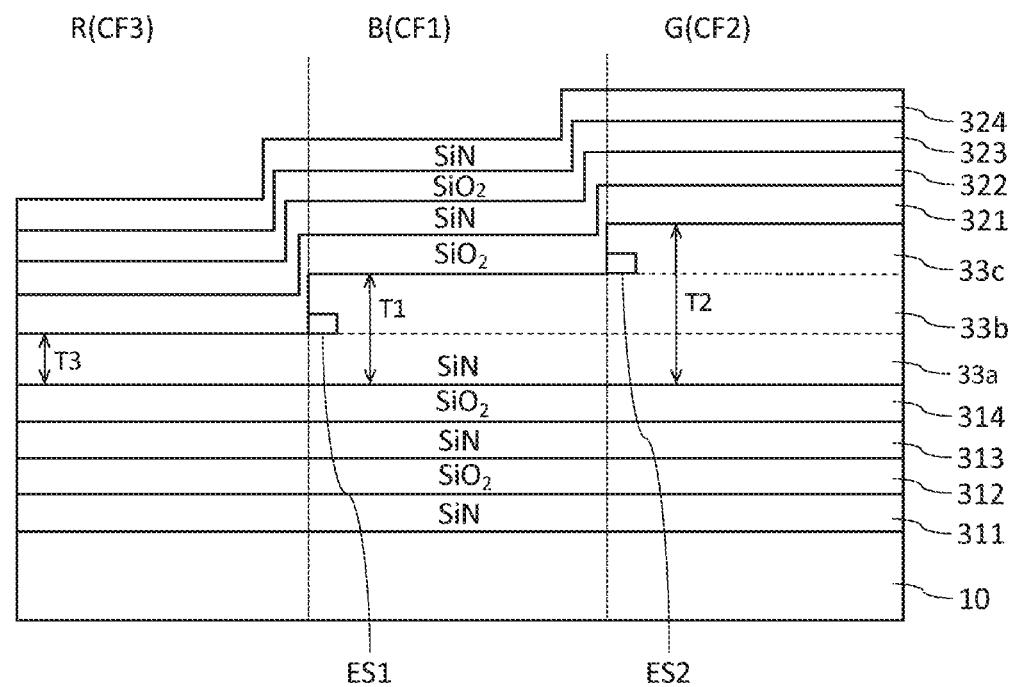
FIG. 26 is a cross-sectional view illustrating a state where the second semi-transmissive layer is formed on the first film, the second film, and the third film configuring the third silicon nitride layer.

FIG. 26 is a cross-sectional view illustrating a state where the second semi-transmissive layer 32 is formed on the first film 33a, the second film 33b, and the third film 33c configuring the third silicon nitride layer 33. The second semi-transmissive layer 32 is configured of the third silicon oxide layer 321, the fourth silicon nitride layer 322, the fourth silicon oxide layer 323, and the fifth silicon nitride layer 324. The third silicon oxide layer 321 is formed on the third silicon nitride layer 33, and the fourth silicon nitride layer 322 is formed on the third silicon oxide layer 321. Then, the fourth silicon oxide layer 323 is formed on the fourth silicon nitride layer 322, and the fifth silicon nitride layer 324 is formed on the fourth silicon oxide layer 323.

By the above manufacturing steps, the film thickness T1 of the transmissive layer (interference layer) configuring the color filter CF1 corresponding to the blue color, the film thickness T2 of the transmissive layer (interference layer) configuring the color filter CF2 corresponding to the green color, and the film thickness T3 of the transmissive layer (interference layer) configuring the color filter CF3 corresponding to the red color can be precisely made uniform in the plane of the array substrate. After the step illustrated in FIG. 26, the manufacturing steps of the respective switching elements configuring the first pixel PX1 displaying the blue color, the second pixel PX2 displaying the green color, and the third pixel PX3 displaying the red color illustrated in FIG. 3 are executed.

Configuration Example 1 of the Switching Element

Figure 27:
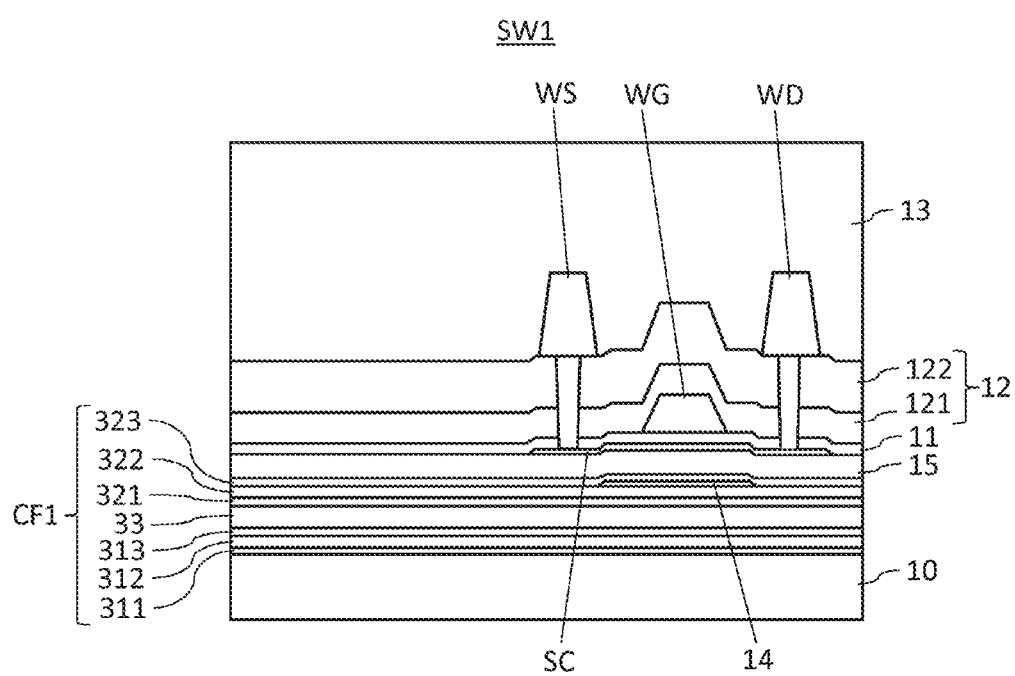
FIG. 27 is a cross-sectional view illustrating a configuration example of a switching element illustrated in FIG. 3 in detail.

FIG. 27 is a cross-sectional view illustrating a configuration example 1 of the switching element illustrated in FIG. 3 in detail. In FIG. 27, the configuration example of the switching element SW1 is representatively illustrated. The switching elements SW2 and SW3 in FIG. 3 can have the same configuration.

As illustrated in FIG. 27, the color filter CF1 having the seven-layer structure illustrated in FIG. 5 is formed on the first insulation substrate 10, and after the manufacturing steps of the color filter CF1, the switching element SW1 is formed on the upper side of the color filter CF1. In this example, the switching element SW1 has a light shield layer 14. The light shield layer 14 is provided in the region corresponding to the lower side of the channel region of the silicon semiconductor layer SC, and is formed of a metal or an alloy. In an example, the light shield layer 14 can be formed of MoW. The light shield layer 14 is formed on the third silicon oxide layer 322, and is covered by the fourth silicon nitride layer 323.

A base insulation film 15 is formed on the fourth silicon nitride layer 323, and the silicon semiconductor layer SC is selectively formed on the base insulation film 15. The base insulation film 15 can also be said to be the interlayer insulation film. The base insulation film 15 can be formed of the silicon oxide. The first insulation film 11 configuring a gate insulation film is provided so as to cover the silicon semiconductor layer SC and the base insulation film 15. The gate electrode WG is provided in the region on the first insulation film 11 corresponding to the upper side of the channel region of the silicon semiconductor layer SC. The second insulation film 12 is formed so as to cover the tops of the first insulation film 11 and the gate electrode WG. The second insulation film 12 is configured of the stack film of a silicon nitride layer 121 and a silicon oxide layer 122 stacked on the silicon nitride layer 121. The third insulation film 13 configured of an organic insulation material such as acryl is formed on the silicon oxide layer 122. The third insulation film 13 has the function as a flattening film. Each of the source electrode WS and the drain electrode WD is contacted with the silicon semiconductor layer SC through the contact hole penetrating through the first insulation film 11 and the second insulation film 12 (121, 122).

Configuration Example 2 of the Switching Element

Figure 28:
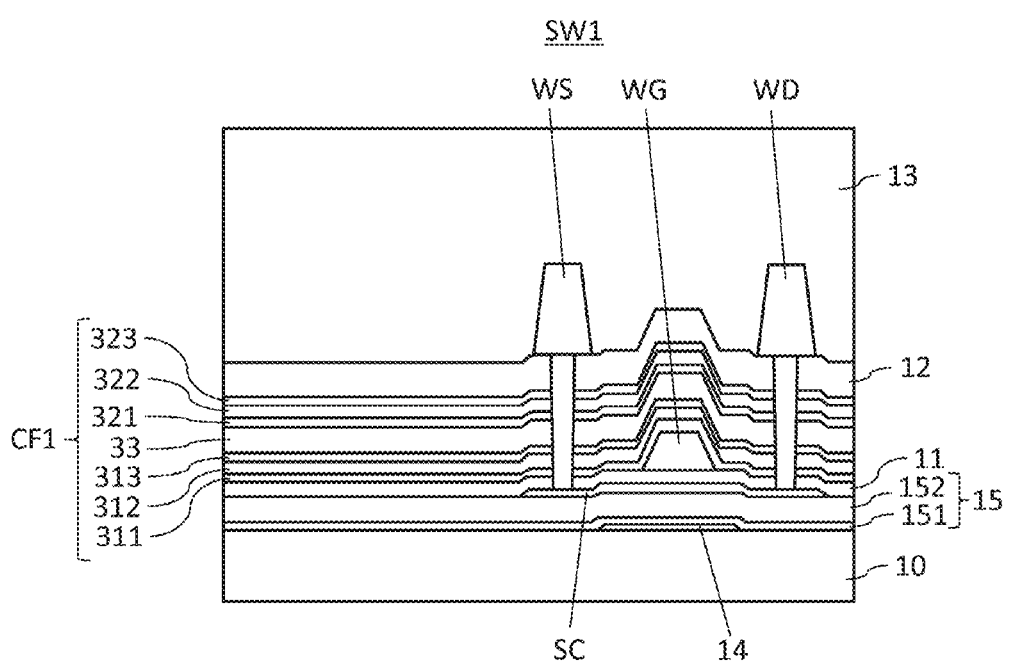
FIG. 28 is a cross-sectional view illustrating another configuration example of the switching element in detail.

FIG. 28 is a cross-sectional view illustrating configuration example 2 of the switching element in detail. In FIG. 28, the configuration example of the switching element SW1 is representatively illustrated. The switching elements SW2 and SW3 in FIG. 3 can have the same configuration.

In FIG. 28, first, the switching element SW1 is formed on the first insulation substrate 10, and after the switching element SW1 is manufactured, the color filter CF1 having the seven-layer structure illustrated in FIG. 5 is formed on the upper side of the switching element SW1. That is, before the manufacturing steps of the color filter CF1, the switching element SW1 is manufactured on the first insulation substrate 10. The light shield layer 14 is formed in the region on the first insulation substrate 10 corresponding to the lower side of the channel region of the silicon semiconductor layer SC. The base insulation film 15 is configured of the stack film of a silicon nitride layer 151 and a silicon oxide layer 152 stacked on the silicon nitride layer 151. The silicon semiconductor layer SC is selectively formed on the silicon oxide layer 152. The first insulation film 11 configuring the gate insulation film is provided so as to cover the silicon oxide layer 152 and the silicon semiconductor layer SC. The gate electrode WG is provided in the region on the first insulation film 11 corresponding to the upper side of the channel region of the silicon semiconductor layer SC.

The color filter CF1 is formed so as to cover the first insulation film 11 and the gate electrode WG. The second insulation film 12 is formed on the color filter CF1. The second insulation film 12 is formed of the silicon oxide. The third insulation film 13 configured of the organic insulation material such as acryl is formed so as to cover the second insulation film 12. The third insulation film 13 has the function as the flattening film. Each of the source electrode WS and the drain electrode WD is contacted with the silicon semiconductor layer SC through the contact hole penetrating through the first insulation film 11, the color filter CF1, and the second insulation film 12.

That is, as illustrated in FIG. 27, the color filter CF may be formed on the lower side of the switching element SW1, and as illustrated in FIG. 28, the color filter CF may be formed on the upper side of the switching element SW1.

(The Configuration Example of the Plane and the Cross Section of the Color Filter)

Figure 29:
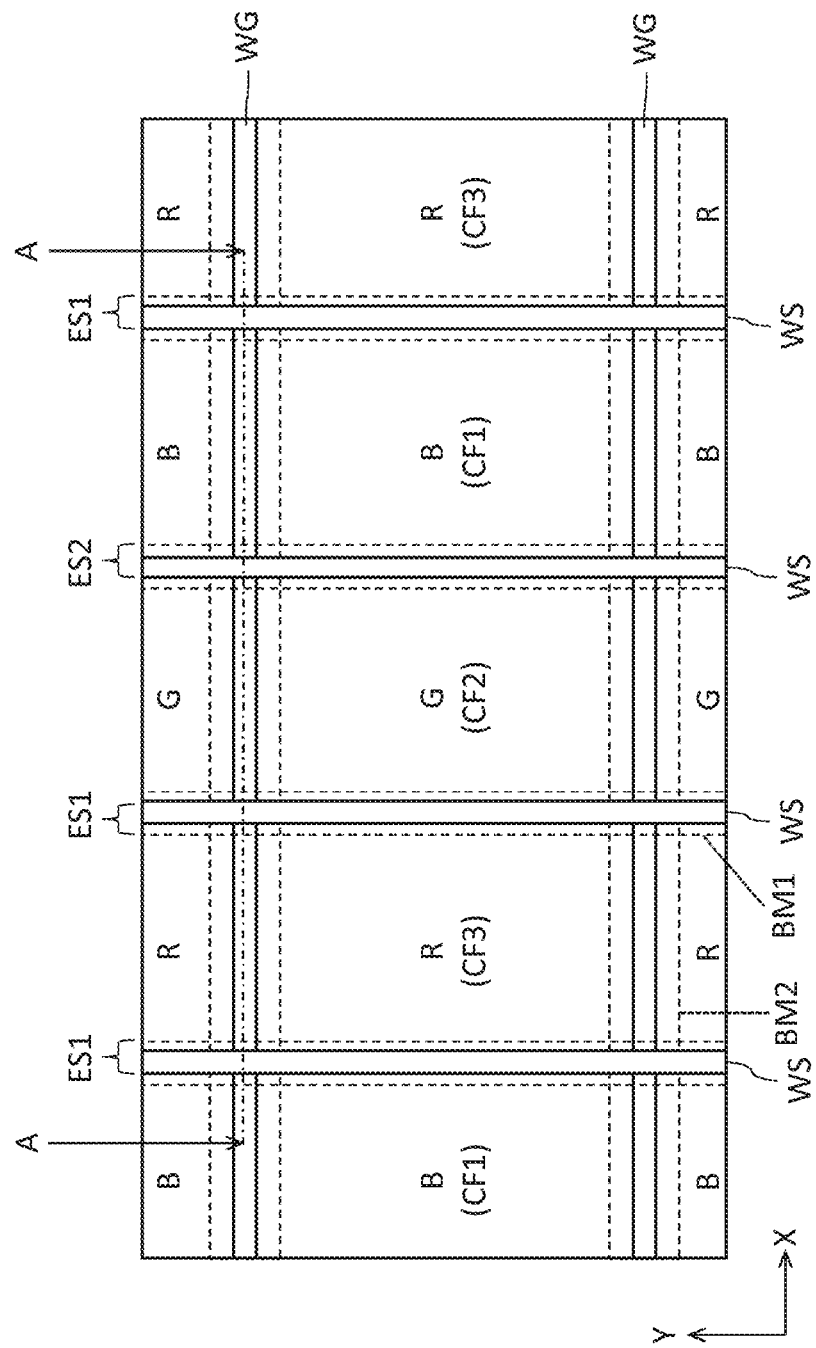
FIG. 29 is a plan view explaining the configuration example of the color filter of the display device according to the embodiment.
Figure 30:
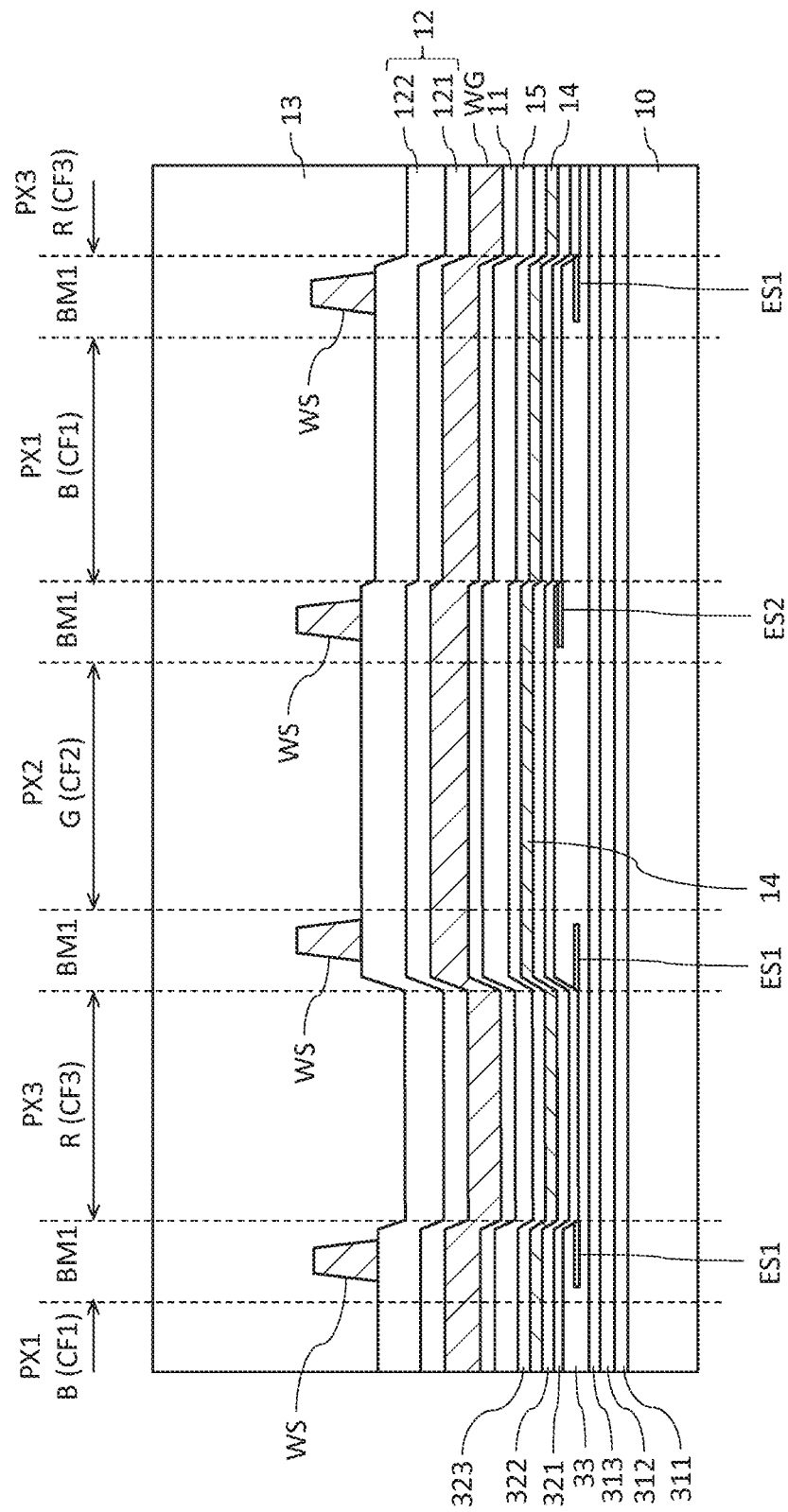
FIG. 30 is a cross-sectional view of the display device taken along line A-A in FIG. 29.

FIG. 29 is a plan view explaining the configuration example of the color filters of the display device according to the embodiment. FIG. 30 is a cross-sectional view of the display device taken along line A-A in FIG. 29. It should be noted that FIG. 30 is the cross-sectional view when the color filters CF1, CF2, and CF3 having the seven-layer structure is adopted, and the description of FIG. 27 can be referred to, so that the overlapped description thereof is omitted.

In FIG. 29, the partial plane arrangement of the first color filter CF1, the second color filter CF2, and the third color filter CF3 provided in the display device 1 is illustrated. A plurality of gate electrodes WG are provided to extend in a first direction X, and are aligned in a second direction Y intersecting the first direction X. A plurality of source electrodes WS are provided to extend in the second direction Y, and are aligned in the first direction X. A plurality of first black matrixes BM1 are provided to extend in the second direction Y so as to cover the upper sides of the respective source electrodes WS. The respective source electrodes WS are located below the plurality of first black matrixes BM1. A plurality of second black matrixes BM2 are provided to extend in the second direction Y so as to cover the upper sides of the respective gate electrodes WG. The respective gate electrodes WG are located below the plurality of second black matrixes BM2. Each of the first color filter CF1, the second color filter CF2, and the third color filter CF3 is provided between a pair of first black matrixes BM1.

In FIG. 29, from the left side to the right side, the first color filter CF1, the third color filter CF3, the second color filter CF2, the first color filter CF1, and the third color filter CF3 are provided. As illustrated in FIGS. 29 and 30, the first etching stopper layer ES1 is present without being etched on the lower side of the first black matrix BM1 provided between the first color filter CF1 and the third color filter CF3 or between the third color filter CF3 and the second color filter CF2. Also, the second etching stopper layer ES2 is present without being etched on the lower side of the first black matrix BM1 provided between the second color filter CF2 and the first color filter CF1.

The region on the lower side of the first black matrix BM1 can also be assumed as a color filter switching region. That is, in the region on the lower side of the first black matrix BM1, the first color filter CF1 and the third color filter CF3 are switched, the third color filter CF3 and the second color filter CF2 are switched, or the second color filter CF2 and the first color filter CF1 are switched. Each of the first etching stopper layer ES1 and the second etching stopper layer ES2 is present in the color filter switching region while remaining without being etched.

As illustrated in FIGS. 29 and 30, the first etching stopper layer ES1 present in the region on the lower side of the first black matrix BM1 is disposed so as to be along the end of the forming region of the third color filter CF3. This is because the first etching stopper layer ES1 defines the film thickness T3 of the first film 33a configuring part of the second silicon oxide layer 33. On the other hand, the second etching stopper layer ES2 present in the region on the lower side of the first black matrix BM1 is provided so as to be along the end of the forming region of the first color filter CF1. This is because the second etching stopper layer ES2 defines the film thickness T1 that is the total of the film thickness T1 of the first film 33a and the film thickness of the second film 33b configuring part of the second silicon oxide layer 33.

According to the embodiments, the film thickness of the transmissive layer configuring each of the first color filter CF1, the second color filter CF2, and the third color filter CF3 (or the spacer layer or the interference layer) can be precisely controlled in the plane of the array substrate. This can provide the high definition display device, as required in the display device for VR (virtual reality).

All the display devices that can be embodied by the appropriate design change by those skilled in the art based on the display device described above as the embodiments of the present invention also belong to the scope of the present invention as long as they encompass the purport of the present invention.

In the idea category of the present invention, those skilled in the art can conceive various change examples and modification examples, and it is understood that those change examples and modification examples belong to the scope of the present invention. For example, the above respective embodiments that are subjected to component addition, deletion, or design change by those skilled in the art as appropriate, or that are subjected to step addition, omission, or condition change by those skilled in the art as appropriate are encompassed in the scope of the present invention as long as they are provided with the purport of the present invention.

Also, it is understood that other operational advantages provided by the forms described in the embodiments that are apparent from the description of this specification or that can be conceived by those skilled in the art as appropriate are, of course, provided by the present invention.

Various inventions can be formed of the appropriate combinations of a plurality of components disclosed in the above embodiments. For example, some components may be deleted from all the components illustrated in the embodiments. Further, the components across the different embodiments may be combined as appropriate.

What is claimed is:

1. A display device comprising:
an array substrate; and
an opposing substrate,
wherein the array substrate has a substrate, and on the substrate, a first pixel having a first color filter and a second pixel having a second color filter disposed adjacent to the first pixel,
wherein each of the first color filter and the second color filter has a first dielectric layer, a transmissive layer disposed on the first dielectric layer, and a second dielectric layer disposed on the transmissive layer,
wherein the transmissive layer of the first color filter has a first film having a first film thickness, wherein the transmissive layer of the second color filter has a second film thickness larger than the first film thickness, wherein on the transmissive layer of the second color filter, a first layer different from the transmissive layer is disposed on a side of the transmissive layer of the first color filter, and wherein a height of a bottom face of the first layer is equal to the first film thickness.

2. The display device according to claim 1, wherein an etching rate of dry etching of the first layer is lower than an etching rate of dry etching of the transmissive layer.

3. The display device according to claim 2, wherein each of the first dielectric layer and the second dielectric layer is a semi-transmissive layer configured of a stack body of a silicon nitride layer and a silicon oxide layer.

4. The display device according to claim 3, wherein the transmissive layer is configured of the silicon nitride layer or the silicon oxide layer, and wherein the first layer is configured of an aluminum oxide film.

5. The display device according to claim 1, wherein the display device further has a third pixel having a third color filter disposed adjacent to the second pixel, wherein the third color filter has the first dielectric layer, the transmissive layer, and the second dielectric layer, wherein the transmissive layer of the third color filter has a third film thickness smaller than the first film thickness, wherein on the transmissive layer of the second color filter, a second layer different from the transmissive layer is disposed on a side of the transmissive layer of the third color filter, and wherein a height of a bottom face of the second layer is equal to the third film thickness.

6. The display device according to claim 5, wherein the etching rate of the dry etching of the first layer and the second layer is lower than the etching rate of the dry etching of the transmissive layer.

7. The display device according to claim 6, wherein each of the first dielectric layer and the second dielectric layer is configured of the stack body of the silicon nitride layer and the silicon oxide layer.

8. The display device according to claim 7, wherein the transmissive layer is configured of the silicon nitride layer or the silicon oxide layer, and wherein each of the first layer and the second layer is configured of the aluminum oxide film.

9. The display device according to claim 5, wherein the opposing substrate includes a black matrix provided in a first direction and a second direction intersecting the first direction, and wherein each of the first layer and the second layer is located below the black matrix provided in the second direction in cross-sectional view.

10. The display device according to claim 9, wherein each of the first pixel to the third pixel includes a switching element having a source electrode and a gate electrode, wherein the source electrode is located below the black matrix provided in the second direction in cross-sectional view, and wherein the gate electrode is located below the black matrix provided in the first direction in cross-sectional view.

11. A method of manufacturing a semiconductor device comprising:

a step of forming a first dielectric layer on a substrate;

a step of forming a transmissive layer on the first dielectric layer; and a step of forming a second dielectric layer on the transmissive layer, wherein the step of forming the transmissive layer includes:

a step of forming, on the first dielectric layer, a first film configuring part of the transmissive layer by a third film thickness;

a step of selectively forming a first etching stopper layer on the first film;

a step of forming a second film configuring part of the transmissive layer so as to cover the first film and the first etching stopper layer;

a step of selectively forming, on the second film, a second etching stopper layer partially overlapped with the first etching stopper layer in cross-sectional view;

a step of forming a third film configuring part of the transmissive layer so as to cover the second film and the second etching stopper layer;

a step of selectively forming, on the third film, a third etching stopper layer partially overlapped with the second etching stopper layer in cross-sectional view;

a first removing step of removing, with the third etching stopper layer as an etching mask of dry etching, the second film and the third film on the first etching stopper layer except for a portion overlapped with the second etching stopper layer, and the third film on the second etching stopper layer except for a portion overlapped with the third etching stopper layer; and a second removing step of removing the first etching stopper layer except for the portion overlapped with the second etching stopper layer, the second etching stopper layer except for the portion overlapped with the third etching stopper layer, and the third etching stopper layer.

12. The method according to claim 11, wherein the third film thickness of the first film of the transmissive layer configures a third color filter, wherein a total film thickness of the third film thickness of the first film and the film thickness of the second film of the transmissive layer is a first film thickness to configure a first color filter, and wherein a total film thickness of the third film thickness of the first film, the film thickness of the second film, and the film thickness of the third film of the transmissive layer is a second film thickness to configure a second color filter.

13. The method according to claim 12, wherein after the step of forming the second dielectric layer, the method includes a step of forming a first switching element configuring a first pixel on the first color filter, a second switching element configuring a second pixel on the second color filter, and a third switching element configuring a third pixel on the third color filter.

14. The method according to claim 12, wherein before the step of forming the first dielectric layer, the method includes a step of forming the first switching element configuring the first pixel on the substrate corresponding to below the first color filter, the second switching element configuring the second pixel on the substrate corresponding to below the second color filter, and the third switching element configuring the third pixel on the substrate corresponding to below the third color filter.

15. The method according to claim 11,
wherein the transmissive layer is configured of a silicon oxide layer,
wherein the step of forming the first dielectric layer includes a step of forming a first silicon nitride layer on the substrate, forming a first silicon oxide layer on the first silicon nitride layer, and forming a second silicon nitride layer on the first silicon oxide layer, and
wherein the step of forming the second dielectric layer includes a step of forming a third silicon nitride layer on the transmissive layer, forming a third silicon oxide layer on the third silicon nitride layer, and forming a fourth silicon nitride layer on the third silicon oxide layer.

16. The method according to claim 15,
wherein the first removing step is dry etching using fluorine as an etching gas, and
wherein the second removing step uses a hydrofluoric acid having a low concentration as an etching solution.

17. The method according to claim 11,
wherein the transmissive layer is configured of a silicon nitride layer,
wherein the step of forming the first dielectric layer includes a step of forming a first silicon nitride layer on the substrate, forming a first silicon oxide layer on the first silicon nitride layer, forming a second silicon nitride layer on the first silicon oxide layer, and forming a second silicon oxide layer on the second silicon nitride layer, and
wherein the step of forming the second dielectric layer includes a step of forming a third silicon oxide layer on the transmissive layer, forming a fourth silicon nitride layer on the third silicon oxide layer, forming a fourth silicon oxide layer on the fourth silicon nitride layer, and forming a fifth silicon nitride layer on the fourth silicon oxide layer.

18. The method according to claim 17,
wherein the first removing step is the dry etching using the fluorine as the etching gas, and
wherein the second removing step uses the developing solution of a resist film as the etching solution.

* * * * *